United States Patent
Hartmann et al.

(10) Patent No.: US 11,840,261 B2
(45) Date of Patent: Dec. 12, 2023

(54) GROUND TRUTH BASED METRICS FOR EVALUATION OF MACHINE LEARNING BASED MODELS FOR PREDICTING ATTRIBUTES OF TRAFFIC ENTITIES FOR NAVIGATING AUTONOMOUS VEHICLES

(71) Applicant: Perceptive Automata, Inc., Boston, MA (US)

(72) Inventors: Till S. Hartmann, Brookline, MA (US); Jeffrey D. Zaremba, Cambridge, MA (US); Samuel English Anthony, Somerville, MA (US)

(73) Assignee: Perceptive Automata, Inc., Boston, MA (US)

( * ) Notice: Subject to any disclaimer, the term of this patent is extended or adjusted under 35 U.S.C. 154(b) by 288 days.

(21) Appl. No.: 17/321,297

(22) Filed: May 14, 2021

(65) Prior Publication Data

US 2021/0357662 A1    Nov. 18, 2021

Related U.S. Application Data

(60) Provisional application No. 63/025,766, filed on May 15, 2020, provisional application No. 63/025,771, filed on May 15, 2020.

(51) Int. Cl.
*G05D 1/02* (2020.01)
*G06N 20/00* (2019.01)
(Continued)

(52) U.S. Cl.
CPC .... *B60W 60/00272* (2020.02); *B60W 60/001* (2020.02); *G05D 1/0221* (2013.01);
(Continued)

(58) Field of Classification Search
None
See application file for complete search history.

(56) References Cited

U.S. PATENT DOCUMENTS

| | | | |
|---|---|---|---|
| 9,802,538 | B2 | 10/2017 | Augst |
| 10,796,169 | B2 | 10/2020 | Kadav et al. |

(Continued)

FOREIGN PATENT DOCUMENTS

WO    WO 2019/094843 A1    5/2019

OTHER PUBLICATIONS

International Search Report and Written Opinion, Patent Cooperation Treaty Application No. PCT/US2021/032638, dated Sep. 23, 2021, 18 pages.

(Continued)

*Primary Examiner* — Idowu O Osifade
(74) *Attorney, Agent, or Firm* — FENWICK & WEST LLP

(57) ABSTRACT

A system uses a machine learning based model to determine attributes describing states of mind and behavior of traffic entities in video frames captured by an autonomous vehicle. The system classifies video frames according to traffic scenarios depicted, where each scenario is associated with a filter based on vehicle attributes, traffic attributes, and road attributes. The system identifies a set of video frames associated with ground truth scenarios for validating the accuracy of the machine learning based model and predicts attributes of traffic entities in the video frames. The system analyzes video frames captured after the set of video frames to determine actual attributes of the traffic entities. Based on a comparison of the predicted attributes and actual attributes, the system determines a likelihood of the machine learning
(Continued)

based model making accurate predictions and uses the likelihood to generate a navigation action table for controlling the autonomous vehicle.

20 Claims, 14 Drawing Sheets

(51) Int. Cl.

| | |
|---|---|
| G06N 5/04 | (2023.01) |
| G06N 3/08 | (2023.01) |
| G06V 20/40 | (2022.01) |
| G06V 20/56 | (2022.01) |
| G06F 18/40 | (2023.01) |
| G06F 18/214 | (2023.01) |
| G06F 18/21 | (2023.01) |
| G06F 18/2113 | (2023.01) |
| G06V 10/764 | (2022.01) |
| G06V 10/82 | (2022.01) |
| G06V 20/58 | (2022.01) |
| G06V 40/20 | (2022.01) |
| B60W 60/00 | (2020.01) |

(52) U.S. Cl.
CPC ......... *G05D 1/0246* (2013.01); *G06F 18/214* (2023.01); *G06F 18/217* (2023.01); *G06F 18/2113* (2023.01); *G06F 18/40* (2023.01); *G06N 3/08* (2013.01); *G06N 5/04* (2013.01); *G06N 20/00* (2019.01); *G06V 10/764* (2022.01); *G06V 10/82* (2022.01); *G06V 20/41* (2022.01); *G06V 20/56* (2022.01); *G06V 20/58* (2022.01); *G06V 40/23* (2022.01); *B60W 2420/42* (2013.01); *B60W 2420/52* (2013.01); *B60W 2552/05* (2020.02); *B60W 2554/408* (2020.02); *B60W 2554/4029* (2020.02); *B60W 2554/4041* (2020.02); *B60W 2554/4044* (2020.02); *B60W 2554/4045* (2020.02); *B60W 2554/4046* (2020.02); *B60W 2554/801* (2020.02); *G05D 2201/0213* (2013.01)

(56) References Cited

U.S. PATENT DOCUMENTS

| | | |
|---|---|---|
| 2018/0114114 A1 | 4/2018 | Molchanov et al. |
| 2019/0012574 A1 | 1/2019 | Anthony et al. |
| 2019/0019087 A1 | 1/2019 | Fukui |
| 2019/0101985 A1 | 4/2019 | Sajda et al. |
| 2019/0162549 A1 | 5/2019 | Fouad et al. |
| 2019/0340416 A1 | 11/2019 | Cao |
| 2020/0406905 A1 | 12/2020 | Dong et al. |
| 2020/0410063 A1 | 12/2020 | O'Malley |
| 2021/0097370 A1* | 4/2021 | Agnihotram ....... G01C 21/3697 |

OTHER PUBLICATIONS

Molchanov, P., et al., "Importance Estimation for Neural Network Pruning," Jun. 25, 2019, arxiv.org, arXiv:1906.10771v1 [cs.LG], 11 pages, doi.org/10.48550/arXiv.1906.10771.

Rasouli, A., et al., "PIE: a Large-Scale Datasets and Models for Pedestrian Intention Estimation and Trajectory Prediction," 2019 IEEE/CVF International Conference on Computer Vision (ICCV), Seoul, Korea (South), 2019, pp. 6261-6270, doi: 10.1109/ICCV.2019.00636.

United States Office Action, U.S. Appl. No. 17/321,309, dated Jun. 7, 2023, 24 pages.

* cited by examiner

GROUND TRUTH BASED METRICS FOR EVALUATION OF MACHINE LEARNING BASED MODELS FOR PREDICTING ATTRIBUTES OF TRAFFIC ENTITIES FOR NAVIGATING AUTONOMOUS VEHICLES

CROSS-REFERENCE TO RELATED APPLICATION

This application claims the benefits of U.S. Provisional Application No. 63/025,766 filed on May 15, 2020 and U.S. Provisional Application No. 63/025,771 filed on May 15, 2020, all of which are incorporated by reference in their entirety.

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The present disclosure relates generally to navigation of autonomous vehicles and more specifically to using ground truth based metrics for evaluation of machine learning based models used for predicting attributes of traffic entities for navigation of autonomous vehicles.

BACKGROUND

An autonomous vehicle uses different types of sensors to receive input describing the surroundings (or environment) of the autonomous vehicle while driving through traffic. For example, an autonomous vehicle may perceive the surroundings using camera images and lidar scans. The autonomous vehicle determines whether an object in the surroundings is stationary, for example, buildings or trees, or the object is non-stationary, for example, a pedestrian, a vehicle, and so on. The autonomous vehicle system predicts the motion of non-stationary objects to make sure that the autonomous vehicle is able to navigate through non-stationary obstacles in the traffic.

Conventional systems predict motion of pedestrians and other vehicles to determine whether they are likely to come in the path of the autonomous vehicle. The autonomous vehicle navigates through traffic so as to avoid collisions with any pedestrians or other vehicles. However, conventional techniques fail to accurately predict motion of certain non-stationary objects for example, pedestrians, bicyclists, and so on. For example, if the autonomous vehicle detects a pedestrian standing in a street corner, the current motion of the pedestrian alone does not provide enough information for predicting whether the pedestrian will cross the street or whether the pedestrian will remain standing on a street corner. Similarly, if the autonomous vehicle detects a bicyclist in a lane, the current motion of the bicycle does not provide enough information for predicting whether the bicycle will change lanes.

Failure of autonomous vehicles to accurately predict motion of non-stationary traffic objects results in unnatural movement of the autonomous vehicle, for example, as a result of the autonomous vehicle suddenly stopping due to a pedestrian moving in the road or the autonomous vehicle continuing to wait for a person to cross a street even if the person never intends to cross the street.

SUMMARY

Embodiments use machine learning based models (ML models) to predict hidden context attributes associated with traffic entities to determine behavior of these traffic entities in the traffic. The traffic entities represent non-stationary objects in the traffic in which the autonomous vehicle is driving, for example, a pedestrian, a bicycle, a vehicle, a delivery robot, and so on. Hidden context includes factors that affect the behavior of such traffic entities, for example, a state of mind of a user represented by a traffic entity such as a pedestrian. A hidden context may represent a task that a user represented by the traffic entity is planning on accomplishing, for example, crossing the street or stepping on to the street to pick up some object. The system uses the hidden context to predict behavior of people near a vehicle in a way that more closely resembles how human drivers would judge the behavior. The hidden context may represent a goal of a user represented by the traffic entity, wherein the user expects to achieve the goal within a threshold time interval. For example, the goal may represent crossing the street to reach the other side of the street within the next few seconds.

In some embodiments, the system extracts video frames that provides a comprehensive coverage of various types of traffic scenarios to train/validate the ML models configured to predict hidden context attributes of traffic entities in various traffic scenarios that the autonomous vehicle may encounter. The system classifies the video frames according to the traffic scenarios depicted in the videos, each scenario associated with a filter based on one or more attributes including (1) vehicle attributes such as speed, turn direction, and so on and (2) traffic attributes describing behavior of traffic entities, for example, whether a pedestrian crossed the street, and (3) road attributes, for example, whether there is an intersection or a cross walk coming up. The system has access to a large volume of video frames, so it is not practical to train the ML models with all of the video frames. Instead, filters can be applied to video frames to identify subsets of video frames representing the various traffic scenarios to ensure proper training for the various traffic scenarios.

In some embodiments, a filter can be applied to the video frames to identify ground truth scenarios for which the result of the prediction can be verified based on concrete pedestrian actions with a high accuracy. For example, ground truth scenarios represent specific scenarios that are associated with one of two possible outcomes, i.e., the person crossed the street or the person did not cross the street. Accordingly, the system inspects the video captured by cameras of the autonomous vehicle to verify whether the traffic entity performed the action corresponding to the ML model output. The system uses the comparison of a predicted behavior and the actual behavior to validate the ML models.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
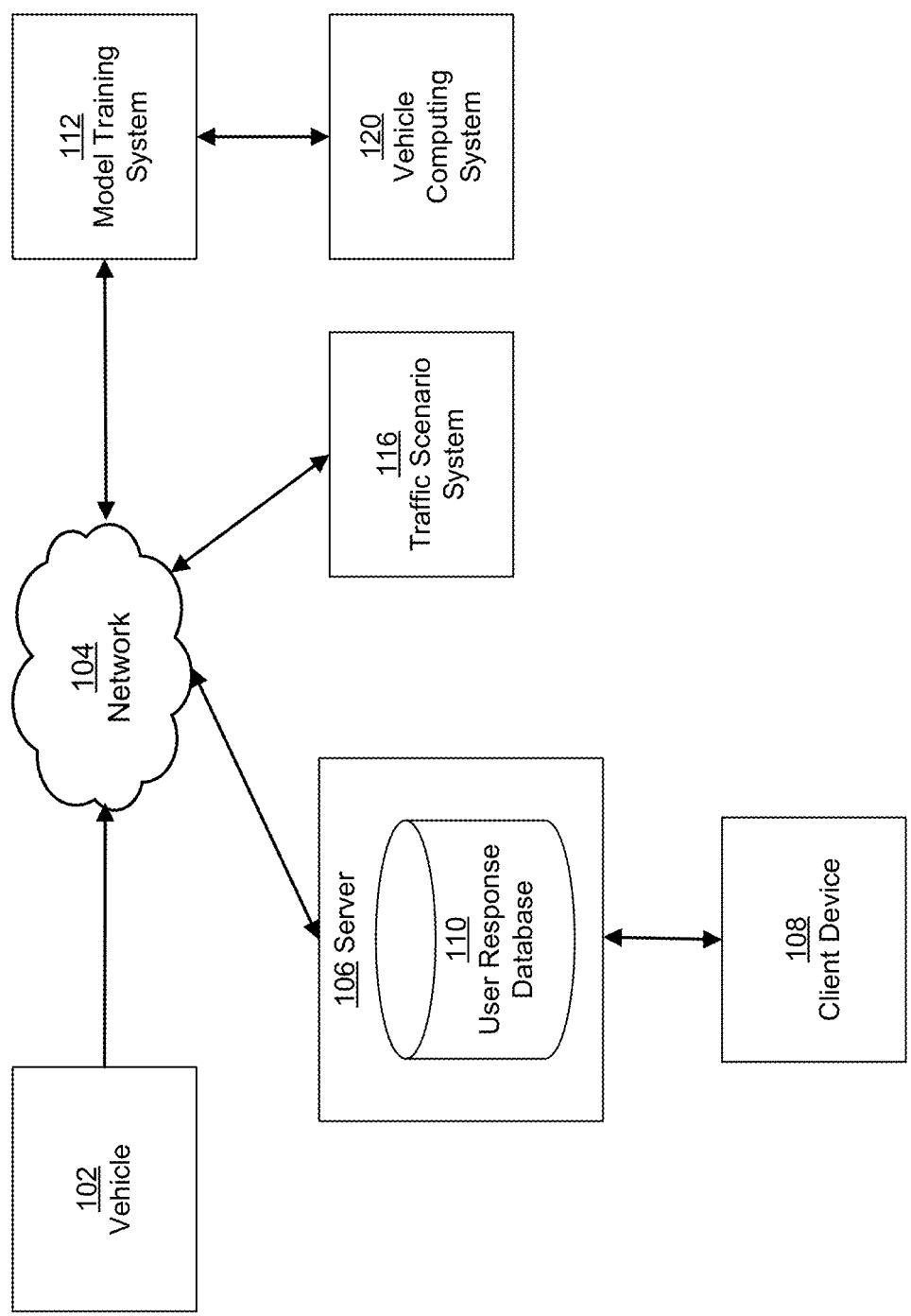
FIG. 1A is a system diagram of a networked system for predicting human behavior, according to some embodiments.

According to an embodiment, an autonomous vehicle identifies traffic entities, for example, based on sensor data captured by sensors on the autonomous vehicle. The sensor data may represent images captured by cameras mounted on the autonomous vehicle or lidar scans captured by a lidar mounted on the autonomous vehicle. For each traffic entity, motion parameters describing movement of the traffic entity are determined. A hidden context is determined based on a machine learning based model. The machine learning based model is trained based on feedback received from users responsive to presenting images or videos showing traffic scenarios to the users. The output of the machine learning based model comprises a measure of statistical distribution of the hidden context.

The autonomous vehicle is navigated based on the motion parameters and the hidden context of each of the traffic entities determined based on the sensor data.

According to an embodiment, the machine learning based model is trained as follows. The system generates stimuli comprising a plurality of video frames representing traffic entities. The stimulus comprises sample images of traffic entities near streets and/or vehicles and indicate or are measured for their understanding of how they believe the people will behave. The stimulus is modified to indicate a turn direction that a vehicle is planning on turning into. For example, the images of the stimuli may include arrows representing the turn direction (e.g., left turn, right turn, no turn). Alternatively, the stimuli may be annotated with text information describing the turn direction. The system presents the stimuli to a group of users (or human observers). These indicators or measurements are then used as a component for training a machine learning based model by outputting a measure of statistical distribution of the hidden context that represents how people will behave in a real-world context. The machine learning based model is trained based on the reactions of human observers to sample images in a training environment. The trained machine learning based model predicts behavior of traffic entities in a real-world environment, for example, pedestrian behavior in traffic as a vehicle navigates through the traffic.

In an embodiment, the autonomous vehicle is navigated by generating signals for controlling the autonomous vehicle based on the motion parameters and the hidden context of each of the traffic entities. The generated signals are sent to controls of the autonomous vehicle.

Systems for predicting human interactions with vehicles are disclosed in U.S. patent application Ser. No. 15/830,549, filed on Dec. 4, 2017 which is incorporated herein by reference in its entirety. Systems for controlling autonomous vehicles based on machine learning based models are described in U.S. patent application Ser. No. 16/777,386, filed on Jan. 30, 2020, U.S. patent application Ser. No. 16/777,673, filed on Jan. 30, 2020, and U.S. patent application Ser. No. 16/709,788, filed on Jan. 30, 2020, and PCT Patent Application Number PCT/US2020/015889 filed on Jan. 30, 2020, each of which is incorporated herein by reference in its entirety.

System Environment

FIG. 1A is a system diagram of a networked system for predicting human behavior according to some embodiments of the present disclosure. FIG. 1A shows a vehicle 102, a network 104, a server 106, a user response database 110, a client device 108, a model training system 112, a vehicle computing system 120, and a traffic scenario system 116.

The vehicle 102 can be any type of manual or motorized vehicle such as a car, bus, train, scooter, or bicycle. In an embodiment, the vehicle 102 is an autonomous vehicle. As described in more detail below, the vehicle 102 can include sensors for monitoring the environment surrounding the vehicle. In one implementation, the sensors can include a camera affixed to any portion of the vehicle for capturing a video of people near the vehicle.

The traffic scenario system 116 determines various traffic scenarios and filters video frames corresponding to each traffic scenario. Some of these traffic scenarios are marked as ground truth scenarios and are used for ground truth analysis. The traffic scenario system 116 further analyzes videos captured by vehicles to determine whether outputs generated by ML models were accurate based on analysis of video frames subsequent to the video frames that were provided as input to the ML model.

The traffic scenario system 116 generates a navigation action table 260 based on the analysis of the model outputs. The navigation action table 260 is used by autonomous vehicles for determining the action to be taken in response to generating certain output using the ML model. The details of traffic scenario system 116 are further described in connection with FIG. 2B.

The network 104 can be any wired and/or wireless network capable of receiving sensor data collected by the vehicle 102 and distributing it to the server 106, the model training system 112, and, through the model training system 112, vehicle computing system 120.

The server 106 can be any type of computer system capable of (1) hosting information (such as image, video and text information) and delivering it to a user terminal (such as client device 108), (2) recording responses of multiple users (or human observers) to the information, and (3) delivering such information and accompanying responses (such as responses input via client device 108) back to the network 104.

The user response database 110 can be any type of database or data storage system capable of storing the image, video, and text information and associated user responses and subsequently recalling them in response to a query.

The model training system 112 trains a machine learning based model configured to predict hidden context attributes of traffic entities. The model training system 112 can be implemented in any type of computing system. In one embodiment, the system 112 receives the image, video, and/or text information and accompanying, or linked, user responses from the database 110 over the network 104. In some embodiments, the text segments are discrete values or free text responses. The model training system 112 can use images, video segments and text segments as training examples to train an algorithm, and can create labels from the accompanying user responses based on the trained algorithm. These labels indicate how the algorithm predicts the behavior of the people in the associated image, video, and/or text segments. After the labels are created, the model training system 112 can transmit them to the prediction engine 144.

The vehicle computing system 120 can be implemented in any computing system. In an illustrative example, the vehicle computing system 120 includes a prediction engine (e.g., prediction engine 114) that executes a machine learning based model that has been trained by the model training system 112. The machine learning based model is configured to output a label for a new (e.g., an actual "real-world") image, video, and/or text segment based on the labels and associated image, video, and/or text segments that it received from the model training system 112. In some embodiments, this label comprises aggregate or summary information about the responses of a large number of users (or human observers) presented with similar image, video, or text segments while the algorithm was being trained.

Figure 1B:
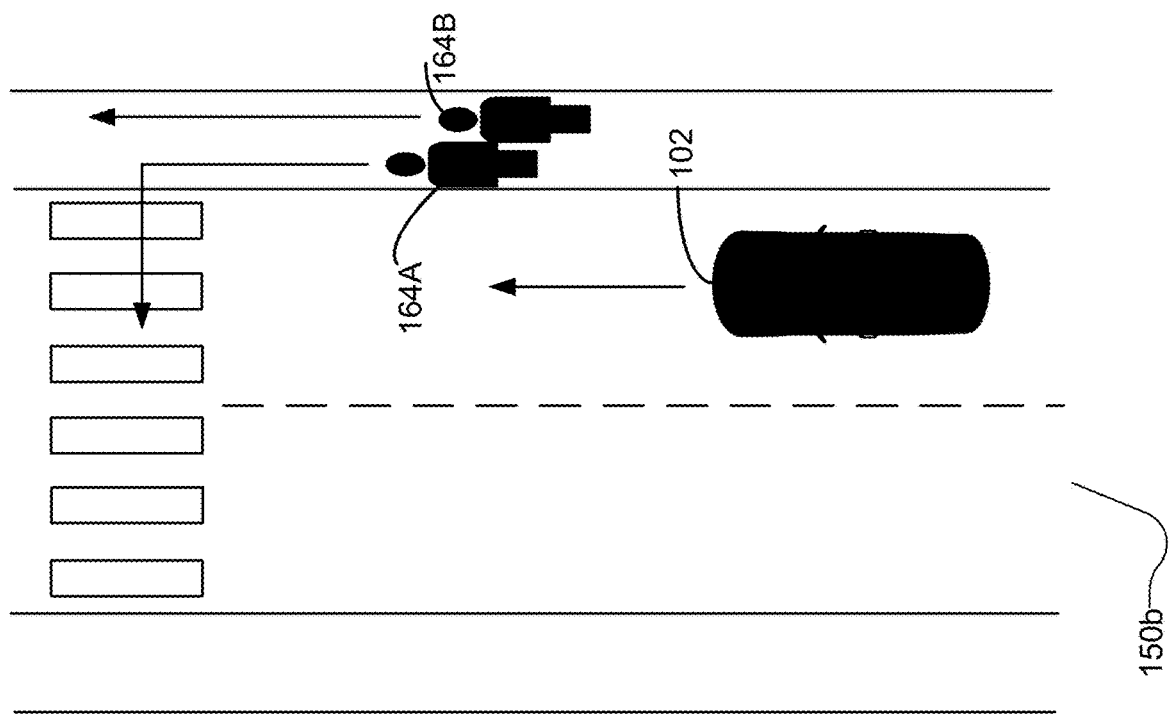
FIGS. 1B-D illustrate various example traffic scenarios that are processed by the traffic scenario system, according to some embodiments.
Figure 1B:
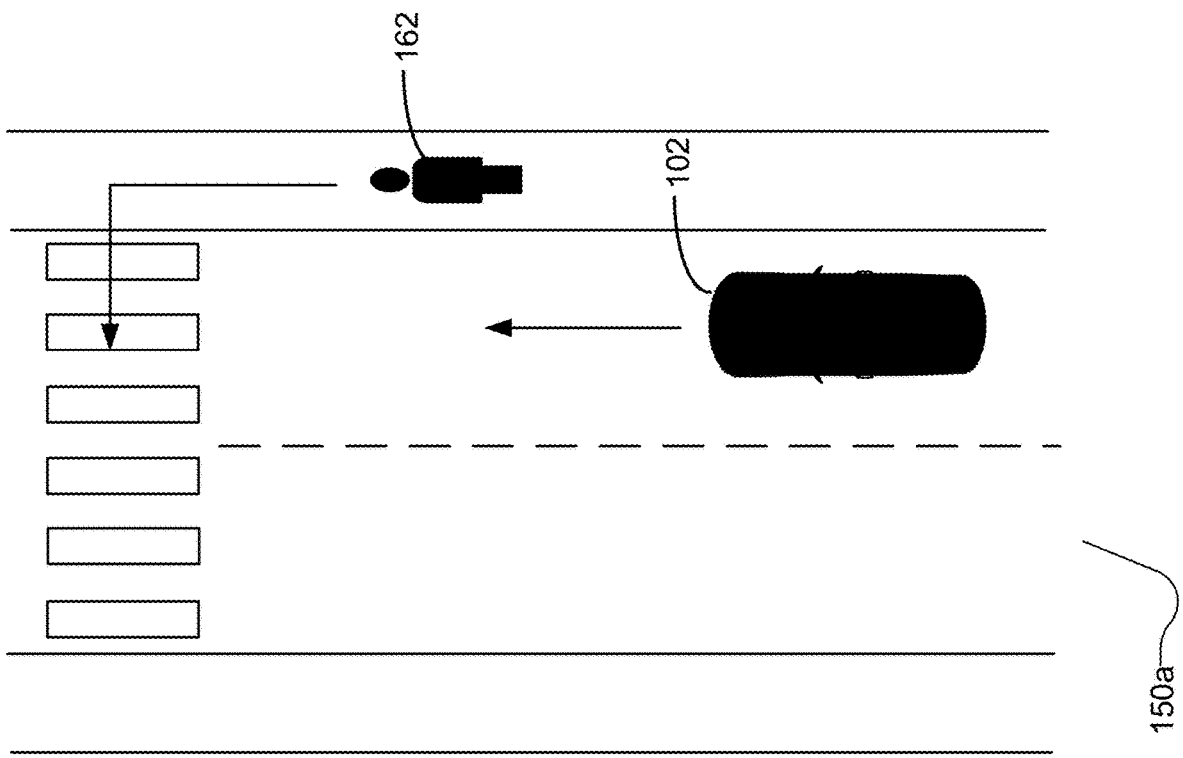
Figure 1C:
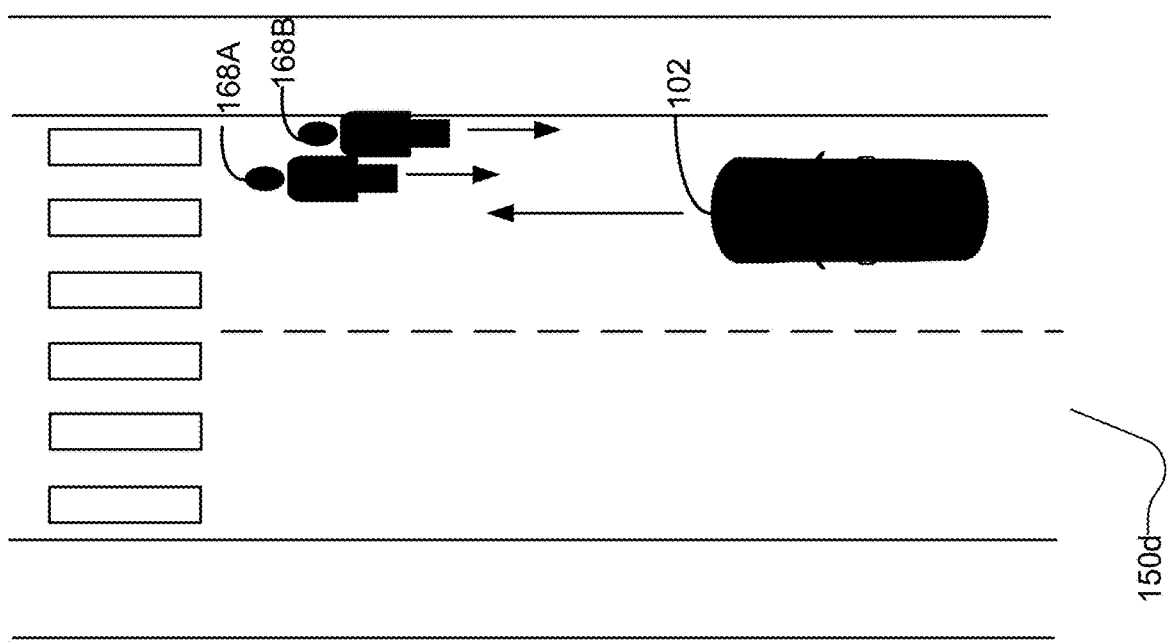
Figure 1C:
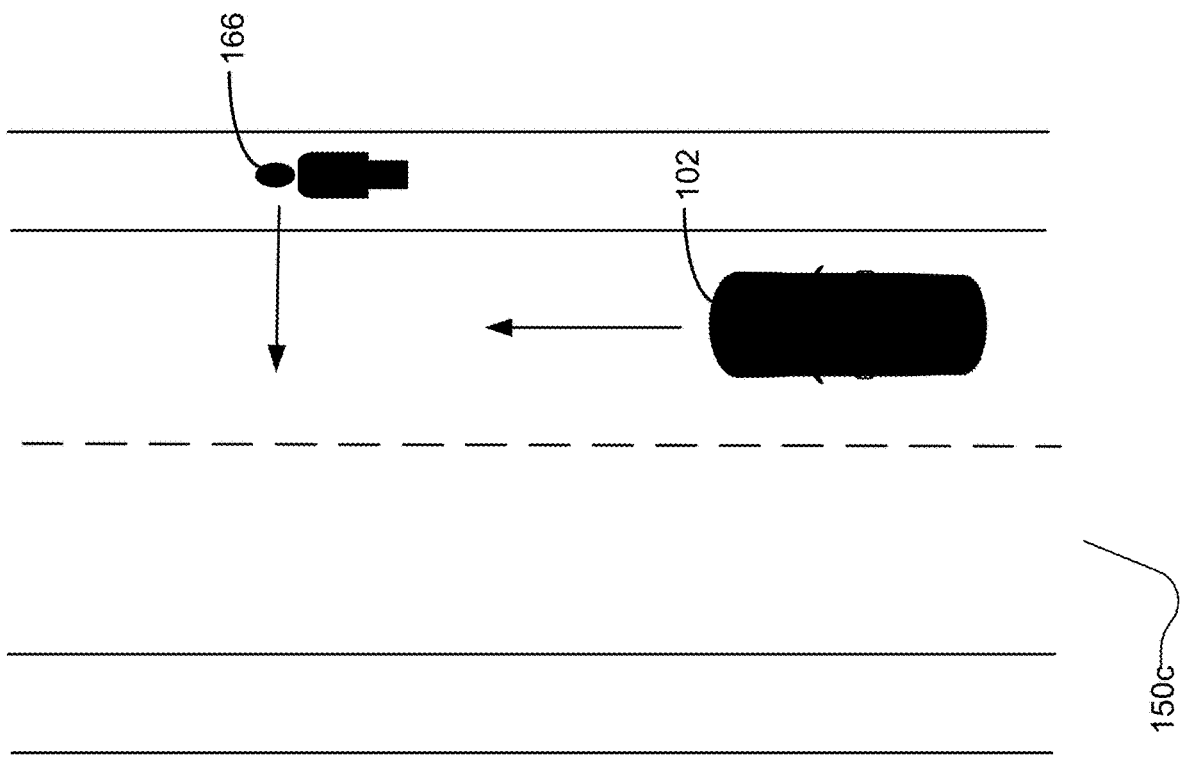
Figure 1D:
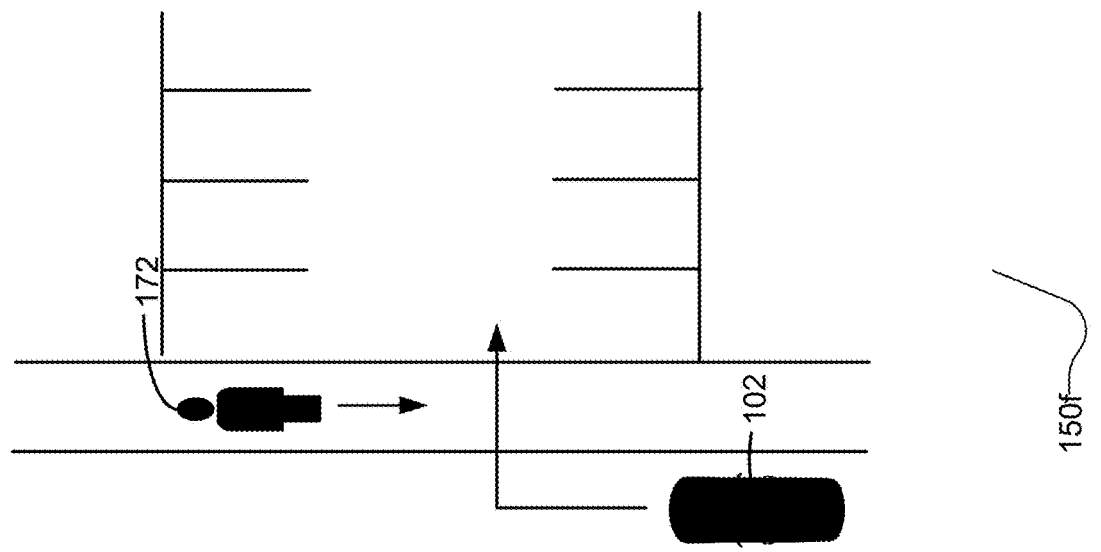
Figure 1D:
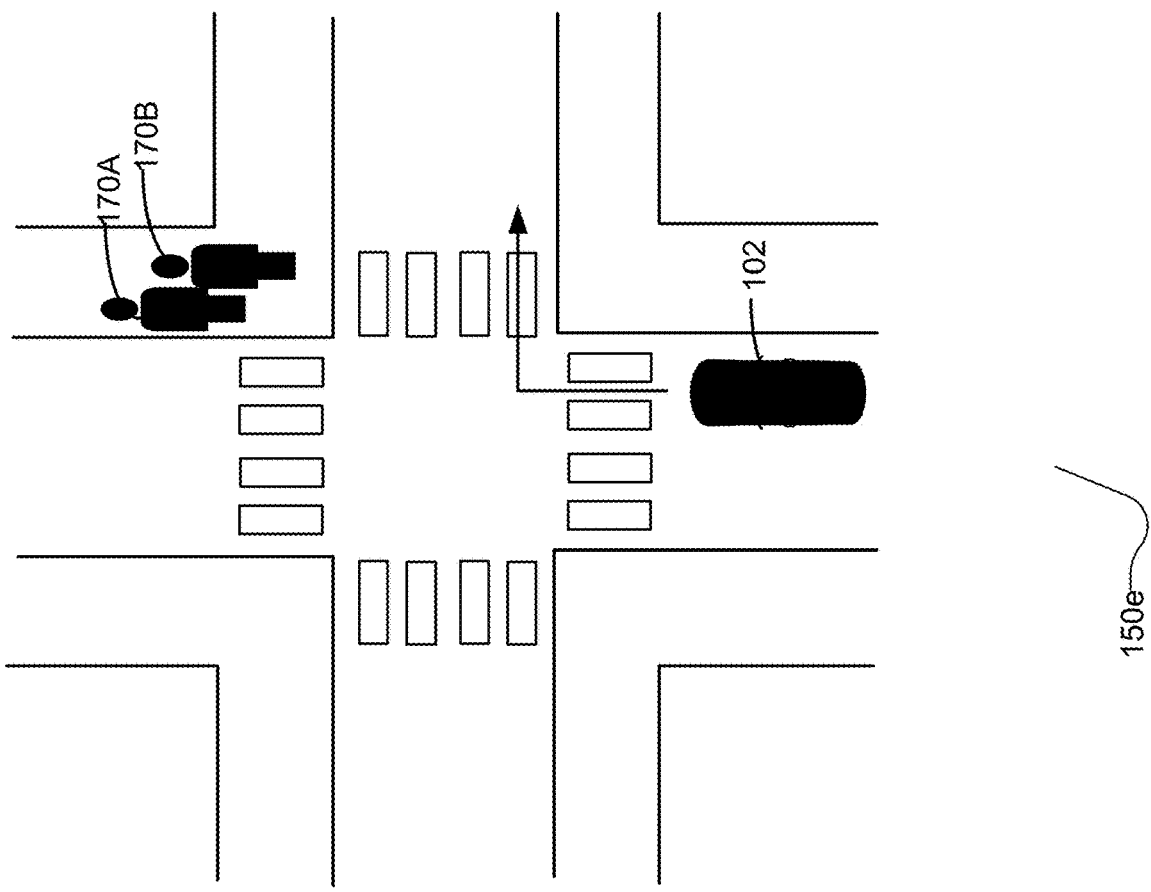

FIGS. 1B-D illustrate various example traffic scenarios 150 that are processed by the traffic scenario system according to some embodiments of the present disclosure. Traffic scenario 150a represents a traffic scenario including a pedestrian 162 that approaches a crosswalk as the vehicle 102 is moving straight. The pedestrian 162 may pause and proceed to cross at the crosswalk when given the chance to do so, continue to walk down the sidewalk, or wait at the crosswalk. Traffic scenario 150b represents a traffic scenario including a crowd 164 walking on a sidewalk parallel to the road towards the crosswalk as the vehicle 102 is moving straight, where a pedestrian 164A crosses at/near the crosswalk when given the chances to do so and another pedestrian 164B continues to walk down the sidewalk. Traffic scenario 150c represents a traffic scenario including a pedestrian 166 that is crossing/jaywalking in front of autonomous vehicle 102 that is moving straight when there is no crosswalk nearby. Traffic scenario 150d represents a traffic scenario including a crowd of pedestrians 168 walking parallel to sidewalk on the road in a direction opposite to the motion of the vehicle. Traffic scenario 150e represents a traffic scenario including an autonomous vehicle 102 turning right at intersection and a crowd of pedestrians 170 standing near crosswalk. Traffic scenario 150f represents a traffic scenario including the autonomous vehicle 102 turning right across sidewalk to enter a parking lot. A pedestrian 162 may walk along the sidewalk in front of the vehicle 102 without stopping, pause and then continue to walk along the sidewalk in front of the vehicle 102, not cross when given the chance to do so, or signal to the vehicle 102 (e.g., wave at the vehicle 102).

As illustrated in the traffic scenarios 150, each traffic scenario can be represented by a set of attributes corresponding to the traffic scenario. The different types of attributes used for specifying a traffic scenario include traffic attributes, vehicle attributes, and road attributes. Each traffic scenario may be associated with a filter including a set of filtering criteria that identifies values of attributes representing the traffic scenario.

Examples of traffic attributes include attributes describing (1) whether traffic includes a pedestrian likely to cross street, (2) whether traffic includes a pedestrian aware of AV, (3) distance of traffic entity from the autonomous vehicle 102, (4) whether pedestrian is on a sidewalk, (5) whether a pedestrian 162 on road, (6) the direction the traffic entity is moving in (towards the autonomous vehicle 102 or away from the autonomous vehicle 102), (7) whether there is one pedestrian or a group of pedestrians, (8) position of the traffic entity relative to the vehicle, (9) physical orientation of the traffic entity, (10) the posture of the pedestrian, (11) past and current motion of the traffic entity (e.g., walking, running, stopping), (12) whether the pedestrian crosses when given the chance to do so, and so on.

Examples of road attributes including attributes describing (1) whether there is cross walk in coming up within threshold distance in the direction in which autonomous vehicle is moving, (2) whether there is intersection within threshold distance in the direction in which autonomous vehicle is moving, (3) whether there are traffic enforcement cameras or personnel nearby, (4) whether there are stop signs or traffic lights, (5) traffic density, (6) whether there is construction nearby, (7) whether there are parked cars along the side of the road, and so on.

Examples of vehicle attributes include attributes describing vehicle 102 (1) speed of driving, (2) turn direction, and (3) location of the vehicle 102, for example, whether the autonomous vehicle 102 is in a large city, small city, outside city boundaries, and so on. Vehicle attribute values are obtained from equipment such as OBD (on-board diagnostics), IMU (inertial measurement unit), or GPS. For example, the vehicle 102 may obtain speed of the vehicle 102 from the IMU, location of the vehicle 102 from GPS, and vehicle diagnostic information from OBD.

Figure 2A:
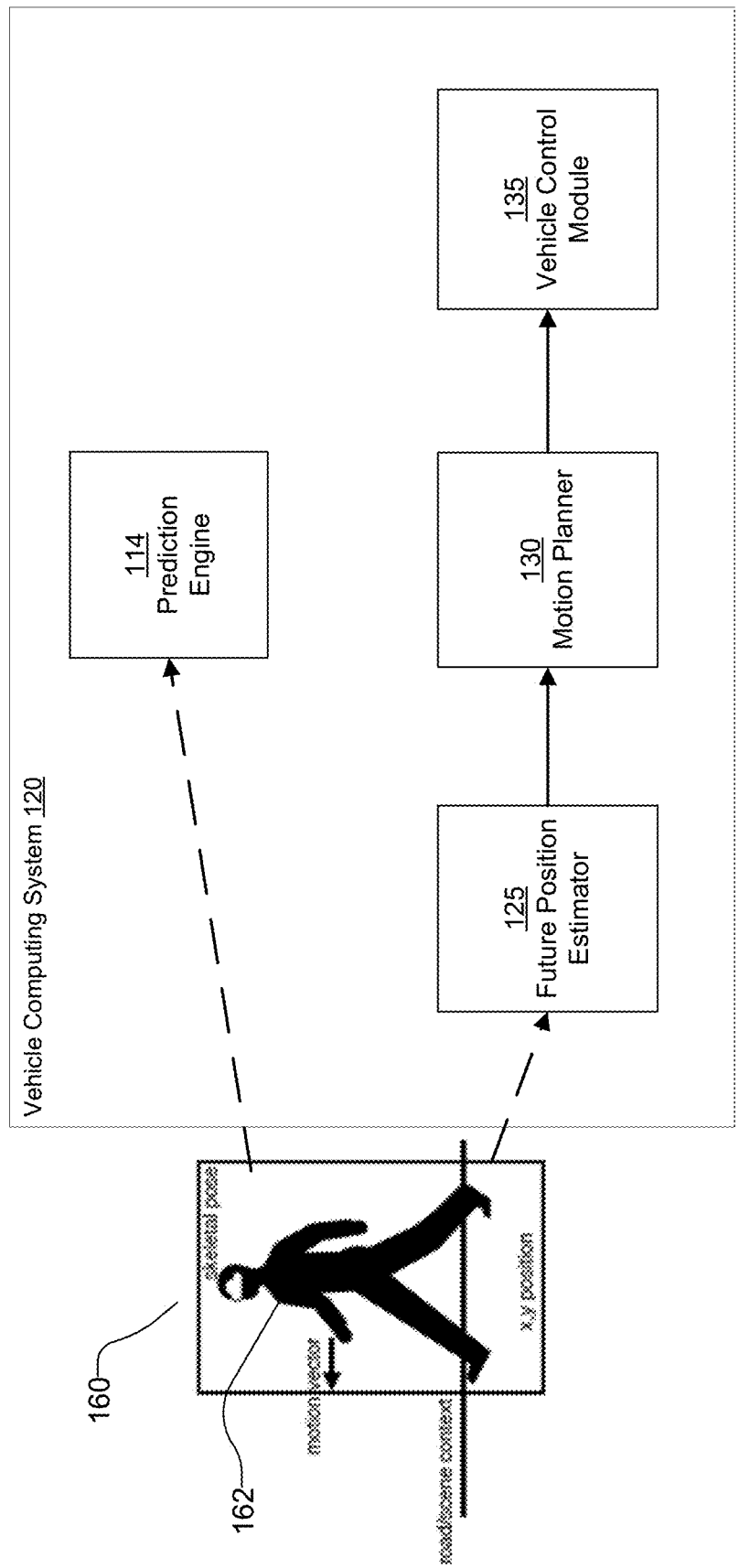
FIG. 2A is the system architecture of a vehicle computing system that navigates an autonomous vehicle based on prediction of hidden context associated with traffic objects, according to some embodiments.

FIG. 2A is the system architecture of a vehicle computing system that navigates an autonomous vehicle 102 based on prediction of hidden context associated with traffic objects according to an embodiment. The vehicle computing system 120 comprises the prediction engine 114, a future position estimator 125, a motion planner 130, and a vehicle control module 135. Other embodiments may include more or fewer modules than those shown in FIG. 2A. Actions performed by a particular module as indicated herein may be performed by other modules than those indicated herein.

The sensors of an autonomous vehicle capture sensor data 160 representing a scene describing the traffic surrounding the autonomous vehicle 102. Examples of sensors used by an autonomous vehicle 102 include cameras, lidars, GNSS (global navigation satellite system such as a global positioning system, or GPS), IMU (inertial measurement unit), and so on. Examples of sensor data includes camera images and lidar scans.

The traffic includes one or more traffic entities, for example, a pedestrian. The vehicle computing system 120 analyzes the sensor data 160 and identifies various traffic entities in the scene, for example, pedestrians, bicyclists, other vehicles, and so on. The vehicle computing system 120 determines various parameters associated with the traffic entity, for example, the location (represented as x and y coordinates), a motion vector describing the movement of the traffic entity, skeletal pose, and so on. For example, a vehicle computing system 120 may collect data of a person's current and past movements, determine a motion vector of the person at a current time based on these movements, and extrapolate a future motion vector representing the person's predicted motion at a future time based on the current motion vector. The vehicle computing system 120 may analyze the motion of the traffic entity over a period of time and determine the motion vector based on changes in the traffic entity's position over the period of time.

The prediction engine 114 applies a machine learning based model that has been trained by the model training system 112 to determine predicted hidden context attributes associated with one or more traffic entities captured in the sensor data 160. Hidden context attributes include factors that affect the behaviors of the traffic entities. For example, a hidden context attribute for a pedestrian may indicate a likelihood of the pedestrian having intention to perform a task (e.g., crossing the street, stopping at intersection, stepping onto the street to pick up an object), and a likelihood of the pedestrian being aware of the vehicle.

The future position estimator 125 estimates the future position of the traffic entity 162. The future position may be extrapolated based on previous and current motion of the traffic entity. The motion planner 130 determines a plan for the motion of the autonomous vehicle 102. The vehicle control module 135 sends signals corresponding to the plan for the motion to the vehicle controls (for example, accelerator, brakes, steering, emergency braking system, and so on) to control the movement of the autonomous vehicle 102. In an embodiment, the future position estimator 125 estimates for the traffic entity 162 determined by the future position estimator 125 based on sensor data 160 are provided as input to the motion planner 130. The motion planner 130 determines a plan for navigating the autonomous vehicle 102 through traffic, and provides a description of the plan to the vehicle control module 135. The vehicle control module 135 generates signals for providing to the vehicle controls. For example, the vehicle control module 135 may send control signals to an emergency braking system to stop the vehicle 102 suddenly while driving, the vehicle control module 135 may send control signals to the accelerator to increase or decrease the speed of the vehicle 102, or the vehicle control module 135 may send control signals to the steering of the autonomous vehicle 102 to change the direction in which the autonomous vehicle 102 is moving.

Figure 2B:
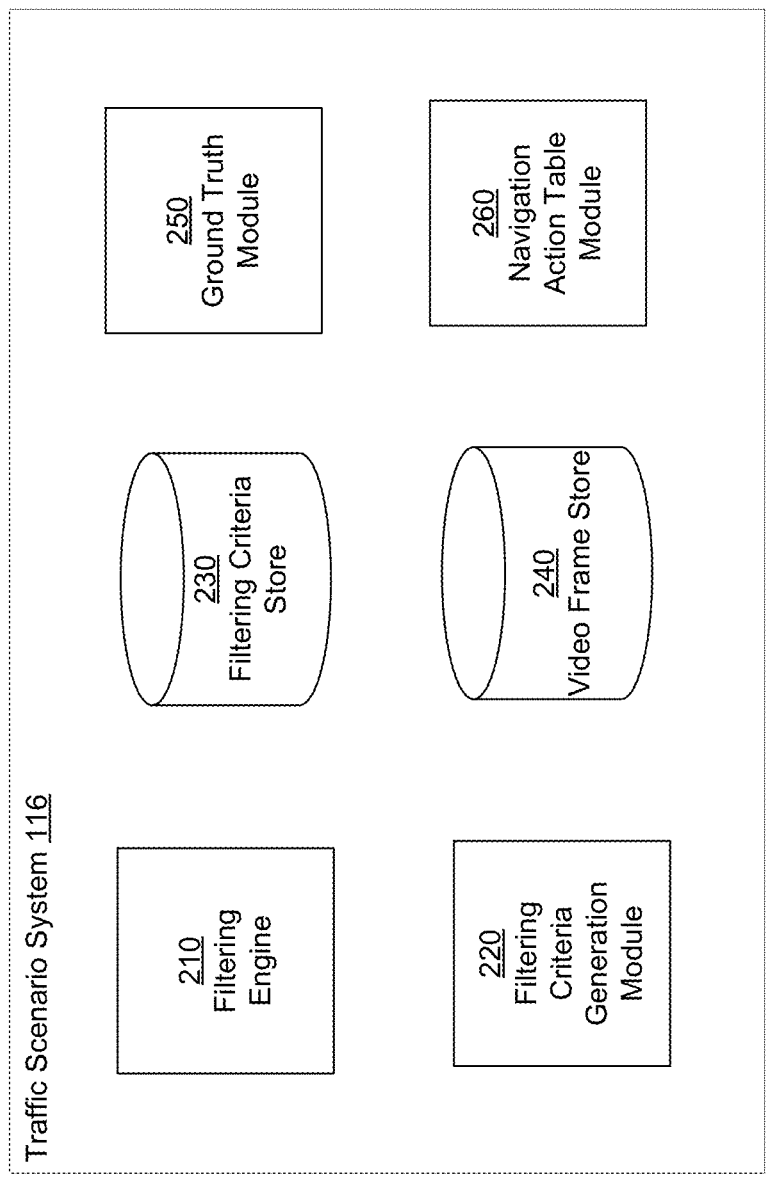
FIG. 2B is the architecture of a traffic scenario system, according to some embodiments.

FIG. 2B is the architecture of a traffic scenario system according to an embodiment. The traffic scenario system 116 comprises a filtering engine 210, a filtering criteria generation module 220, a filtering criteria store 230, a video frame store 240, ground truth module 250, and navigation action table module 260. Other embodiments may include more or fewer modules that those indicated in FIG. 2B.

The traffic scenario system 116 extracts videos/video frames representing different traffic scenarios from videos for training and validating ML models. The system determines different types of scenarios that are extracted for training/validation of models so as to provide a comprehensive coverage of various types of traffic scenarios. The system receives a filter based on various attributes including (1) vehicle attributes such as speed, turn direction, and so on and (2) traffic attributes describing behavior of traffic entities, for example, whether a pedestrian has intent to cross the street, and (3) road attributes, for example, whether there is an intersection or a cross walk coming up. The system applies the filter to video frames to identify sets of video frames representing different scenarios. The video frames classified according to various traffic scenarios are used for ML model validation or training.

The filtering engine 210 receives a set of filtering criteria associated with a traffic scenario as input and processes a set of input video frames to identify a subset of video frames that satisfy the received set of filtering criteria. In an embodiment, the set of filtering criteria is an expression comprising a set of subexpressions associated with a traffic scenario, and the filtering engine 210 processes individual subexpressions of the expression to identify subsets of video frames of input video frames associated with attributes specified by the subexpressions. Accordingly, the filtering engine 210 implements a pipeline in which each stage of the pipeline receives a set of video frames output by the previous stage and processes a subexpression to determine which video frames satisfy the subexpression and outputs the resulting subset of video frames to the next stage of the pipeline. In an embodiment, the filtering engine works as an offline process that takes a set of video frames and filtering criteria representing traffic scenarios and processes them as a batch process to identify subsets of video frames that correspond to different traffic scenarios. Each traffic scenario is associated with a set of filtering criteria is represented by a unique expression.

In an embodiment, the filtering engine 210 orders the subexpressions of a set of filtering criteria in an order based on the computational cost corresponding to each subexpression. In an embodiment, the filtering engine 210 orders the subexpressions of a filtering criterion such that lower cost subexpressions are evaluated earlier in the pipeline compared to higher cost expressions.

The filtering criteria generation module 220 generates filtering criteria for use in training and validation of ML models used by the autonomous vehicle 102. In an embodiment, the filtering criteria generation module 220 determines possible values for various attributes. These values may be provided by an expert or determined from a database of previously obtained values. For example, the range of speed of a vehicle 102 may be obtained from various speed values previously obtained from the vehicle 102. In an embodiment, the filtering criteria generation module 220 divides the set of possible values for an attribute into smaller subsets or sub ranges or even individual values. The filtering criteria generation module 220 generates subexpressions based on the subsets/subranges/individual values. For example, if a variable V1 can take values in ranges R1, R2, R2, and so on, the filtering criteria generation module 220 generates subexpressions V1 in R1, V1 in R2, and so on. The filtering criteria generation module 220 generates filtering criteria associated with a traffic scenario by combining subexpressions based on different attributes of the traffic scenario.

The filtering criteria store 230 stores sets of filtering criteria, each set of filtering criteria associated with a traffic scenario and sets of values or ranges of values of attributes representing the traffic scenario. In an embodiment, the traffic scenario system 116 receives the filtering criteria corresponding to different scenarios from users, for example, experts. For example, to identify videos depicting a traffic scenario in which a vehicle is moving straight toward a crosswalk that does not have traffic lights and at least one pedestrian crossing at the crosswalk, the filtering criteria may include searching for attributes including (1) at least one identified pedestrians, (2) at least one identified pedestrian in motion, (3) crosswalk identified within a threshold distance of the vehicle, (4) no signal light detected, (5) vehicle moving straight, and other such attributes representing the scenario. In other embodiments, the traffic scenario system 116 automatically generates the filtering criteria. For example, the system receives ranges of possible values of attributes such as vehicle attributes, road attributes or traffic attributes. The system divides each range of values for an attribute into sub-ranges or sets of values. The system combines various subranges/sets of values of attributes to generate different filtering criteria, where each combination corresponds to a traffic scenario.

In an embodiment, each set of filtering criteria is specified as an expression comprising sub-expressions, each subexpression representing a predicate based on a value or sets of values or ranges of values of a particular attribute, for example, a predicate evaluating to true if the value of the particular attribute for the input video frames is within a specific range (or belongs to a predefined set of values), and false otherwise, or a predicate evaluating to true if the value of the particular attribute for the input video frames is equal to a specific value, and false otherwise. For example, a road attribute RA1 may have value 1 if there is a cross walk within a threshold distance of the autonomous vehicle 102 and 0 otherwise; an vehicle attribute VA1 may represent the speed of the vehicle 102; a traffic attribute TA1 may have value 1 if a pedestrian is crossing the street in front of the autonomous vehicle 102 and 0 if the pedestrian decides not to cross the street. A set of filtering criteria may be represented as the expression (RA1=1 and VA1=0 and TA1=1) represents traffic scenarios in which the autonomous vehicle 102 is stopped (speed is zero) and there is a cross walk ahead of the autonomous vehicle 102 and there is a pedestrian crossing the street. The filtering criteria (RA1=1 and VA1=0 and TA1=0) represents traffic scenarios in which the autonomous vehicle 102 is stopped (speed is zero), there is a cross walk ahead of the autonomous vehicle 102, and there is a pedestrian standing on the side of the street but not crossing.

The system evaluates the expression in a pipeline fashion by starting with an input set of video frames and filtering the input set into smaller and smaller sets of video frames as each subexpression is evaluated. In an embodiment, the system orders the subexpressions associated with a traffic scenario based on their computational complexity so as to evaluate computationally simpler subexpressions before more computationally complex subexpressions. Applying filtering criteria in the order of increasing computational complexity is beneficial because by reducing the number of video frames to be applied with more complex filtering criteria, computational time can be reduced and computational resources can be saved. Each attribute may be associated with a cost measure representing an estimate of the computational cost of determining the value of the attribute for a video frame. Accordingly, the cost estimate represents a measure of the computational complexity of evaluating a subexpression based on the attribute for a video frame. For example, the cost of determining the speed of the vehicle 102 for a video frame is low since it involves retrieving a metadata value. On the other hand, a cost of determining that a pedestrian is crossing the street involves executing a neural network using the video frame and is higher.

In some embodiments, the filtering criteria store 230 marks certain filtering criteria as ground truth scenarios for validation of ML models. A ground truth scenario represents a scenario for which the result of the prediction can be verified based on the pedestrian behavior with a high accuracy. For example, each ground truth scenario is associated with one of two possible outcomes that can be verified, i.e., the person crossed the street or the person did not cross the street. The traffic scenarios system 116 can apply the machine learning model to a video captured by cameras of the autonomous vehicle and compare the outcome determined based on the machine learning model to the actual outcome to verify whether the machine learning based model predicted the outcome accurately.

According to various embodiments ground truth scenarios include scenarios in which there is an interaction between the autonomous vehicle and a pedestrian (or other traffic entity). Ground truth scenarios include scenarios in which the pedestrian is within a threshold distance of the AV. Furthermore, the pedestrian is within a threshold distance of the side of the road such that the person is able to cross the street if the person wanted to or choose not to cross. Furthermore, ground truth scenarios are associated with one of a plurality of outcomes, for example two possible outcomes: (1) the person crossed the street or (2) the person did not cross the street. Furthermore, the speed of the autonomous vehicle was low enough to allow the person to safely cross in front of the AV. Note that ground truth is determined for situations where the pedestrian was given a chance to cross (for example, by slowing down or stopping the vehicle 102). If the vehicle 102 determines not to slow down or stop, the scenario may not be used for ground truth.

The filtering criteria for ground truth scenarios may be provided by an expert. Alternatively, filtering criteria for ground truth scenarios are determined by analyzing a set of videos representing historical data. The traffic scenario system 116 associates video frames with different scenarios based on attributes, each video frame including at least a pedestrian close to the autonomous vehicle and also close to the side of the street. The traffic scenario system 116 further analyzes video frames occurring within a threshold time frames after the above video frame was captured, the subsequent video frames showing whether the pedestrian (1) stays on the same side of the street or (2) crosses the street.

Validation of ML models used for predicting attributes of traffic entities is difficult for the following reasons. The data used for training and validation is obtained from videos captured by vehicles driving through traffic. The ML models predict attributes of traffic entities that represent values such as state of mind and awareness. These attributes do not have any concrete values in the data that can be accessed for confirming a prediction of the ML model. For example, a pedestrian may be waiting to cross the street in front of the autonomous vehicle. However, if the ML model predicts incorrectly that the pedestrian did not intend to cross, the autonomous vehicle is unlikely to stop for the pedestrian, thereby causing the pedestrian to change his/her intention and stay on the sidewalk. Accordingly, an incorrect prediction by the ML model may modify the actual value of the attribute of the traffic entity being predicted. This makes it difficult to determine what the actual value of the attribute when it was predicted, thereby making it difficult to validate the ML model. Furthermore, attributes such as awareness of the autonomous vehicle are difficult to verify since the traffic entity typically does not perform any concrete action that indicates awareness of the AV. For example, a bicyclist may continue driving whether or not the bicyclist is aware of the autonomous vehicle or not. One way to establish ground truth for such an ML model would be to ask the pedestrian or bicyclist, which is impractical and not feasible in a scenario in which the autonomous vehicle is navigating through real world traffic.

Instead, sensor data collected by the AV while in operation is analyzed by the traffic scenario system 116 to identify a subset of video frames that satisfy the filtering criteria of ground truth scenarios with known actual outcomes that the output of the ML models can be compared to. Since actual outcomes are not known for all video frames, the performance of the ML models for the subset of video frames associated with ground truth scenarios is used as a proxy for the performance of the ML models across all traffic scenarios.

The video frame store 240 stores video frames and metadata describing the video frames. The metadata describing the video frames includes vehicle attributes that were received from the vehicle 102 when the video frame was captured, for example, speed of the vehicle 102, angle of steering wheel, location of the vehicle 102 and so on. The metadata describing the video frame also includes attributes that are determined by analyzing the video frame, for example, by executing various types of machine learning based models using the video frame.

The ground truth module 250 processes select video frames for determining ground truth values for ML models. The ground truth represents outcome of verification of result that was predicted by an ML model. In an embodiment, the ground truth module 250 performs offline processing of logs generated by autonomous vehicles 102 as a result of driving through traffic. Details on determining the ground truth values is described with respect to FIGS. 5A-5C.

The navigation action table module 260 generates a navigation action table that maps values of ML model outputs to actions that an autonomous vehicle 102 should take. In particular, given a particular value of the ML model output, an autonomous vehicle can look up the navigation action table to determine what action should be taken by the AV. For example, the navigation action may be to continue driving, slow down, or stop. Details on generating and applying the navigation action table is described with respect to FIGS. 5A-5C.

Figure 3:
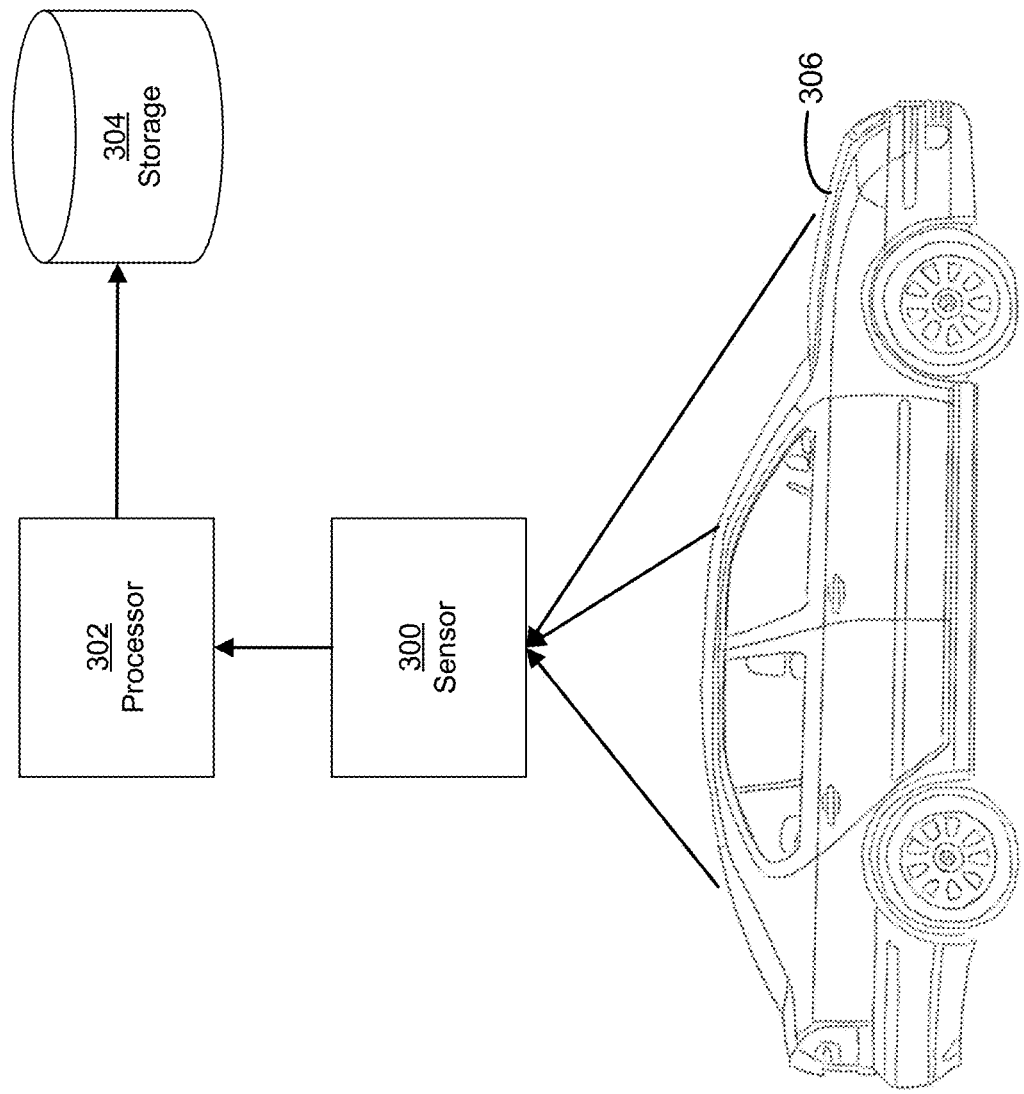
FIG. 3 is a system diagram showing a sensor system associated with a vehicle, according to some embodiments.

FIG. 3 is a system diagram showing a sensor system associated with a vehicle, according to some embodiments. FIG. 3 shows a vehicle 306 with arrows pointing to the locations of its sensors 300, a local processor 302, and remote storage 304.

Data is collected from cameras or other sensors 300 including solid state Lidar, rotating Lidar, medium range radar, or others mounted on the vehicle 306 in either a fixed or temporary capacity and oriented such that they capture images of the road ahead, behind, and/or to the side of the vehicle 306. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video frames.

In some embodiments, data in the remote storage 304 also includes database tables associated with the sensor data. When sensor data is received, a row can be added to a database table that records information about the sensor data that was recorded, including where it was recorded, by whom, on what date, how long the segment is, where the physical files can be found either on the internet or on local storage, what the resolution of the sensor data is, what type of sensor it was recorded on, the position of the sensor, and other characteristics.

Figure 4:
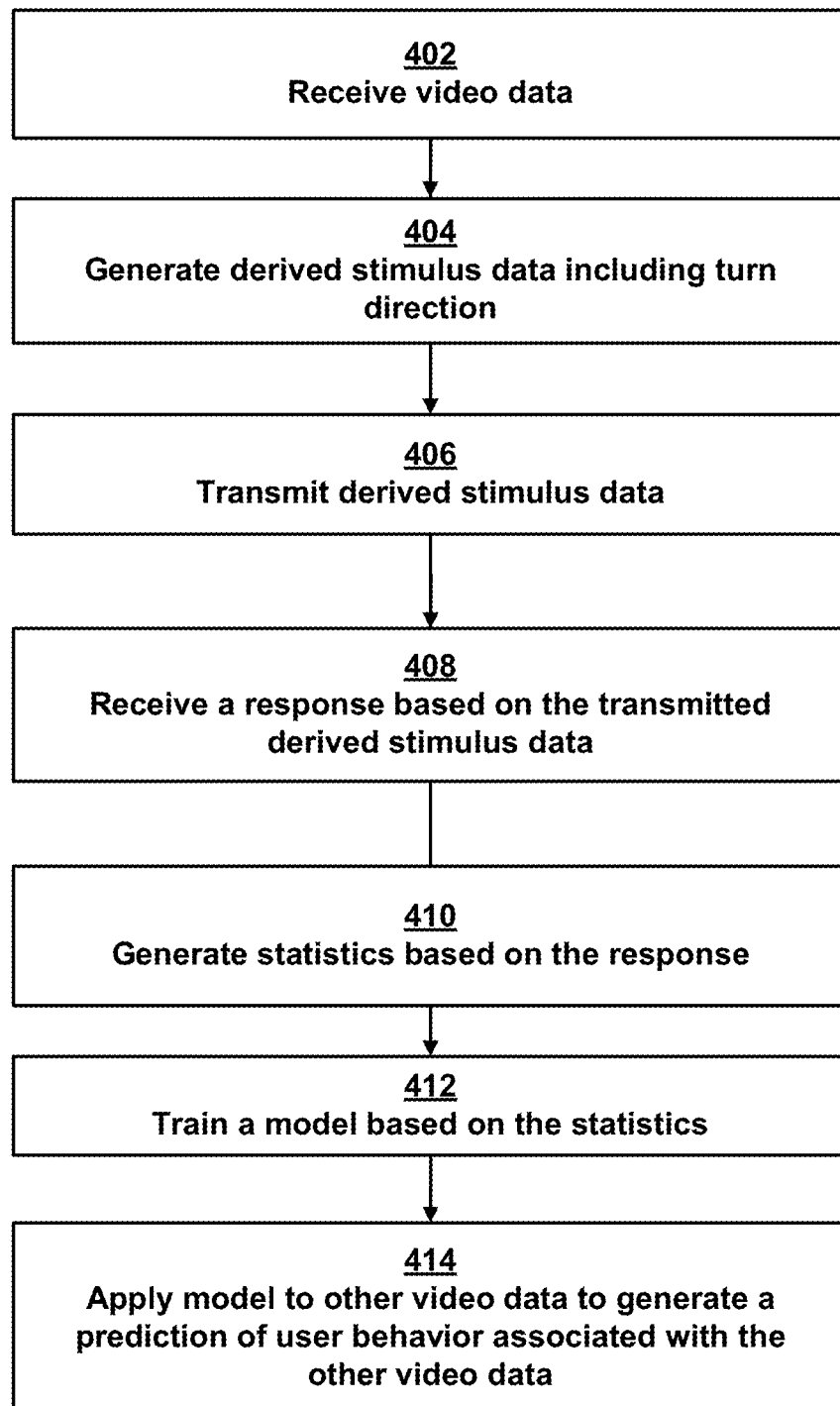
FIG. 4 is a flowchart showing a process of training a machine learning based model to predict hidden context information describing traffic entities, according to some embodiments.

FIG. 4 is a flowchart showing a process of training a machine learning based model to predict hidden context information describing traffic entities, according to some embodiments. In one implementation, video or other data is captured by a camera or sensor mounted on the vehicle 102. The camera or other sensor can be mounted in a fixed or temporary manner to the vehicle 102. The camera does not need to be mounted to an automobile, and could be mounted to another type of vehicle, such as a bicycle. As the vehicle travels along various streets, the camera or sensor captures still and/or moving images (or other sensor data) of pedestrians, bicycles, automobiles, etc. moving or being stationary on or near the streets. In step 402, this video or other data captured by the camera or other sensor is transmitted from the vehicle 102, over the network 104, and to the server 106 where it is stored. The server 106 stores video or other data captured by a plurality of vehicles 102 that are in operation in various settings and conditions, and these video or other data are used to generate a training dataset used to train ML models.

Then, in step 404, video frames or segments are extracted from the stored video or other data and are used to create stimulus data including derived stimulus (or stimuli). In one implementation, the derived stimulus corresponds to a scene in which one or more traffic entities are conducting activities (e.g., standing, walking, driving, riding a bicycle, etc.) near a vehicle that collected the video or other data of the scene. In an embodiment, the stimulus is modified to include information describing a turn direction in which the vehicle is expected to turn within a short time interval, for example, turn left/right/continue straight within the next few seconds.

The server 106 generates derived stimuli from raw camera or sensor data of the vehicle for presenting to human observers. As described above, sensor data can include video segments or specific frames. These frames can either be contiguous or non-contiguous, and can be in the original order, in a permuted order, in reverse order, or in random order. Some of the frames can be repeated once or more than once.

Some of the frames may be manipulated. The frames can be manipulated by adjusting pixel values. These manipulations can include blurring, the addition or one or more occluding bars, bands, or shapes, sharpening, the removal of color information, the manipulation of color information, the drawing of non-occluding or highlighting shapes on the image, other manipulations, or a combination of the manipulations listed here, or a combination of the manipulations listed here with other manipulations, or other manipulations of the pixels not listed combined with each other. The manipulations serve the purpose of highlighting, occluding or degrading portions of the image, so that when the images are shown to the human observers, they are directed to people or specific portions of the image when predicting what the people in the images will do. For example, using the highlighting described above, a certain pedestrian in a scene can be isolated such that a human observer's feedback can be more reliably associated with the pedestrian. Frames may be recombined to form a derived stimulus. In some embodiments, if there is only one frame, that frame comprises the derived stimulus. If there is more than one frame those frames may then be recombined.

The stimuli are presented to users that act as annotators via a user interface. The user interface is configured to present an image (or series of frames) of a traffic environment captured from a perspective of a driver of a vehicle. The image is annotated with information describing the direction the vehicle is turning into or planning on turning into. For example, the image may include a pedestrian to the right who is standing at the corner of an intersection waiting for the signal to change. The image may include a bounding box around the pedestrian and an arrow indicating that the vehicle plans on turning right. The user interface also presents the annotators with a question based on the traffic entity in focus (e.g., how likely if this person, to cross in front of the vehicle, given a direction in which the vehicle is turning).

As explained in more detail below for example in step 406, as part of the training process for the prediction algorithm, users view the derived stimulus and predict how they believe the traffic entities shown in the derived stimulus will act. In yet a further implementation, after the video frames or segments are extracted from the stored data, the derived stimulus is generated by manipulating the pixels or equivalent array data acquired from the camera or other sensor in step 414, producing a new data file that conveys a portion of the information from the original video with certain aspects highlighted or obscured. For example, to encourage the users to focus on the traffic entity, portions of the image outside of a threshold distance from the traffic entity may be blurred or cropped out.

In step 406, the derived stimulus is transmitted from the server 106 and displayed to a large number of users (or human observers) on the client device 108 (or multiple client devices 108). Human observers are recruited to participate on one or several crowdsourcing websites, such as Amazon's Mechanical Turk or at a physical location provided with a display. The observers are given detailed written and pictorial instructions explaining the task that they are about to complete. These instructions give examples of situations that might be depicted in the derived stimuli, and the kinds of responses that would be appropriate for those situations. For example, if human observers are asked to judge the intention of a pedestrian to walk in front of a car, the instructions may be: "In this test, we want you to pretend you're driving a car. You'll see road scenes with cyclists highlighted, and you'll have to decide what they're planning to do. Try to answer as quickly as you can."

The client devices(s) 108 prompt the human observers to predict how the traffic entities shown in the derived stimulus will act, and upon viewing the displayed stimulus, the observers input their responses corresponding to their predictions. For example, the human observers may predict that a bicyclist will continue riding, whether a first person in the stimulus will cross the street, whether another person will remain standing on a street corner, and yet another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on the client devices(s) 108 by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving.

In step 408, the derived stimulus and associated human observer responses are transmitted from the client device(s) 108 to the server 106 and recorded in the user response database 110. Predictions and other information is collected from human observers based on derived stimuli. Human observers are given detailed instructions about how to answer questions about derived stimuli. Those observers are presented with derived stimuli and asked to answer questions about them. The observers respond to the stimuli and those responses are recorded. The human observers may be shown a display which includes the derived stimulus. The display also includes a mechanism for making a judgment about the stimulus. The mechanism for making the judgment can be a continuous indicator such as a ribbon on which the observer could drag a control to a certain point. The mechanism can also be an ordinal measure such as a Likert scale where the observer can make a judgment about a degree of certainty of the judgment. The mechanism can also be a control that the human observer drags with their mouse to draw a trajectory onscreen indicating a judgment. The mechanism can also be a text entry field where the observer types a description of their judgment.

The judgment that the human observer makes is a hidden context attribute that may represent an evaluation of the state of mind of a road user depicted in the derived stimulus. The evaluation can be of the intention, awareness, personality, state of consciousness, level of tiredness, aggressiveness, enthusiasm, thoughtfulness or another characteristic of the internal mental state of the pictured road user. If the ratings collected are on an ordinal scale they can describe the characteristic using language of probability, such as "the other driver may be attentive" or "the other driver is definitely attentive" or "the other driver is definitely not attentive".

The recorded responses are aggregated and logged in a database, for example, the user response database 110. In step 410, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can also characterize the human observer responses in terms of certain parameters associated with the statistics, such as a content of a response, a time associated with entering a response, and a position of an eye of a human observer associated with the response. The parameters can also be associated with a central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

The ratings of large numbers of human observers are collected. Summary statistics are generated based on the responses of all of the observers who looked at an image. Individual variability in responses to a given stimulus can be characterized in the information given by the observers to the learning algorithm. The summary statistics might include unweighted information from all observers, or might exclude observers based on extrinsic or intrinsic criteria such as the time it took an observer to respond, the geographical location of an observer, the observer's self-reported driving experience, or the observer's reliability in making ratings of a set of other images.

The explicit response of the observer is recorded as well as implicit data. The implicit data can include how long the subject took to respond, if they hesitated in their motions, if they deleted keystrokes, if they moved the mouse anywhere other than the location corresponding to the response they eventually chose, where their eyes moved, or other implicit measures.

The responses are aggregated and recorded in a data structure, such as the user response database 110. This data structure is then sent as a text field to a networked computer system running database software and logged in a database.

For each stimulus rated by each human observer, a response is recorded that could be a continuous, discrete, or ordinal value. This value may refer to the probability of the pictured human road user has a given state of mind—e.g. that a pedestrian is likely to cross the street or that an oncoming vehicle is unlikely to be willing to yield to the vehicle containing the sensor if the vehicle containing the sensor needs to turn. In some embodiments, a higher ordinal value (e.g., the ordinal 4 as shown in FIG. 6) indicates that a human observer believes that there is a higher probability that the pictured human road user has a given state of mind or will perform a particular action. On the other hand, a lower ordinal value (e.g., the ordinal 1) indicates that the human observer believes that there is a lower probability that the pictured human road user has the state of mind or will perform the particular action. On the other hand, in some embodiments, a lower ordinal value can indicate a higher probability of an action, and a higher ordinal value can indicate a lower probability of an action.

An amount of time associated with a subject responding to the derived stimulus may also be recorded. In some embodiments, this time is associated with the overall reliability of the human observer's rating. For example, a response associated with a lower response time may be weighted higher and a response associated with a slower response time may be weighted lower.

Summary statistics of a video frame or derived stimulus is generated. These summary statistics could include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above. The calculated summary statistics are linked to the video frame or sensor data frame associated with the responses from which they were calculated.

The summary statistics is used for training machine learning based models. The machine learning based model may be any type of supervised learning algorithm capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or nonlinear kernels that are two dimensional or three dimensional.

In step 412, the stored statistics and corresponding images (e.g., the video frames or segments that were extracted from the video or other data (captured from the camera or sensor of the vehicle 202)) are sent over the network 104 to the model training system 112 and used to train a prediction algorithm. For example, the collection of images and statistics can be used to train a supervised learning algorithm, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning algorithm which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video frames that the summary statistics were generated from. In one implementation, this subset includes the pixel data contained in a bounding box drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as the dimensions and location of the bounding box, the shape of the bounding box or the change in size or position of the bounding box from one frame to the next.

In step 414, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

In one embodiment of the model training system 112, the machine learning based model can be a deep neural network. In this embodiment the parameters are the weights attached to the connections between the artificial neurons comprising the network. Pixel data from an image in a training set collated with human observer summary statistics serves as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., back-propagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set. At the end of this process the model is "trained", which in some embodiments, means that the difference between the summary statistics output by the neural network and the summary statistics calculated from the responses of the human observers is minimized.

Navigating Autonomous Vehicle Based on Hidden Context

The vehicle computing system 120 predicts hidden context representing intentions and future plans of a traffic entity (e.g., a pedestrian or a bicyclist). The hidden context may represent a state of mind of a person represented by the traffic entity. For example, the hidden context may represent a near term goal of the person represented by the traffic entity, for example, indicating that the person is likely to cross the street, or indicating that the person is likely to pick up an object (e.g., a wallet) dropped on the street but stay on that side of the street, or any other task that the person is likely to perform within a threshold time interval. The hidden context may represent a degree of awareness of the person about the autonomous vehicle, for example, whether a bicyclist driving in front of the autonomous vehicle is likely to be aware that the autonomous vehicle is behind the bicycle.

The hidden context may be used for navigating the autonomous vehicle, for example, by adjusting the path planning of the autonomous vehicle based on the hidden context. The vehicle computing system 120 may improve the path planning by taking a machine learning based model that predicts the hidden context representing a level of human uncertainty about the future actions of pedestrians and cyclists and uses that as an input into the autonomous vehicle's motion planner. The training dataset of the machine learning models includes information about the ground truth of the world obtained from one or more computer vision models. The vehicle computing system 120 may use the output of the prediction engine 114 to generate a probabilistic map of the risk of encountering an obstacle given different possible motion vectors at the next time step. Alternatively, the vehicle computing system 120 may use the output of the prediction engine 114 to determine a motion plan which incorporates the probabilistic uncertainty of the human assessment.

In an embodiment, the prediction engine 114 determines a metric representing a degree of uncertainty in human assessment of the near-term goal of a pedestrian or any user representing a traffic entity. The specific form of the representation of uncertainty is a model output that is in the form of a probability distribution, capturing the expected distributional characteristics of user responses of the hidden context of traffic entities responsive to the users being presented with videos/images representing traffic situations. The model output may comprise summary statistics of hidden context, i.e., the central tendency representing the mean likelihood that a person will act in a certain way and one or more parameters including the variance, kurtosis, skew, heteroskedasticity, and multimodality of the predicted human distribution. These summary statistics represent information about the level of human uncertainty.

In an embodiment, the vehicle computing system 120 represents the hidden context as a vector of values, each value representing a parameter, for example, a likelihood that a person represented by a traffic entity is going to cross the street in front of the autonomous vehicle, a degree of awareness of the presence of autonomous vehicle in the mind of a person represented by a traffic entity, and so on.

Process of Filtering Video Frames for a Traffic Scenario

Figure 5:
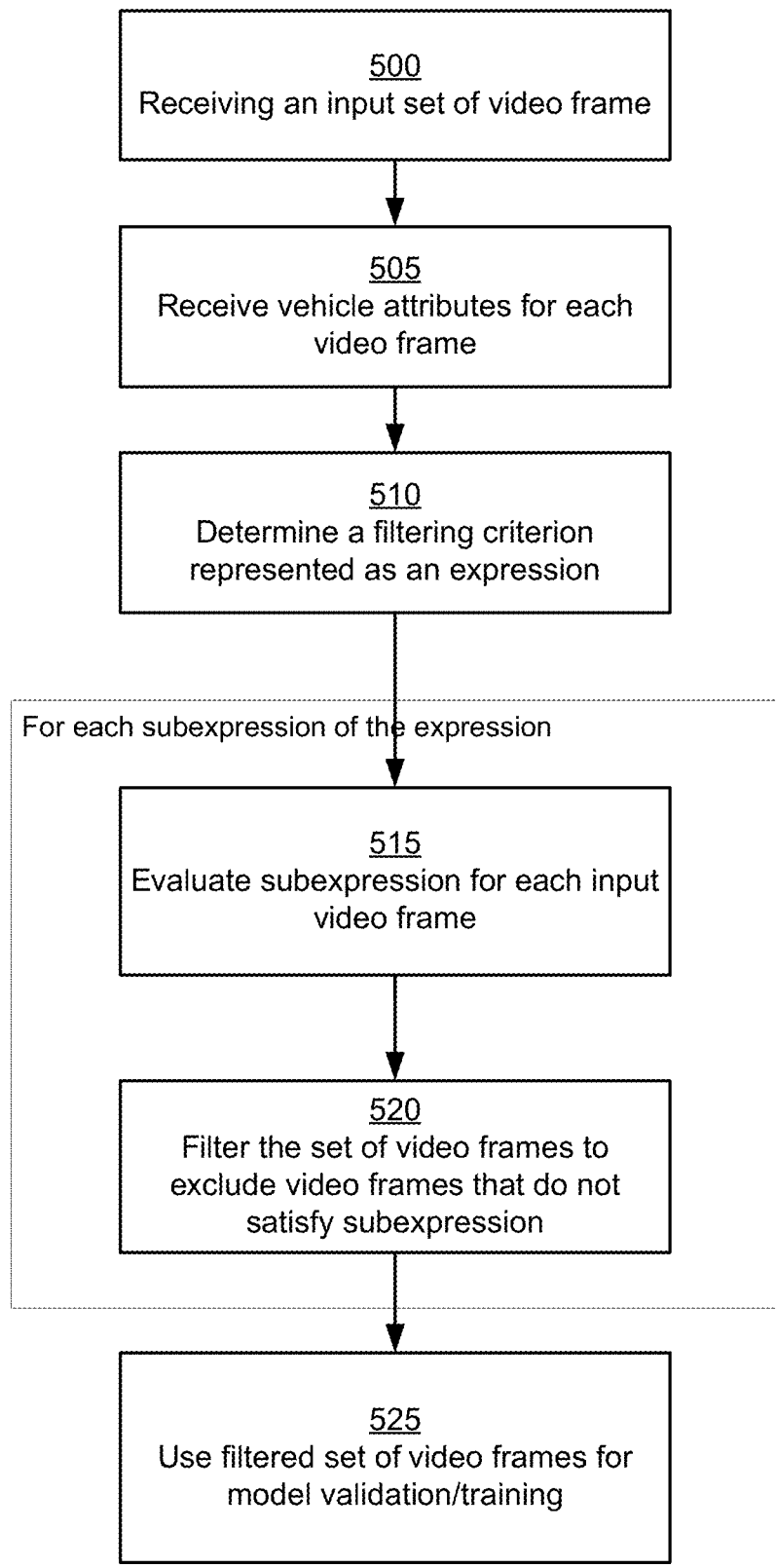
FIG. 5 represents a flowchart illustrating the process of filtering video frames according to various traffic scenarios, according to an embodiment.

FIG. 5 represents a flowchart illustrating the process of filtering video frames according to various traffic scenarios, according to an embodiment. The system receives 500 an input set of video frames for processing. The video frames may have been captured by one or more vehicles driving through traffic. The system also receives 505 vehicle attributes for each video frame. For example, the system may receive the vehicle speed, location, and any other parameters describing the vehicle.

The system determines 510 a filtering criterion represented as an expression based on various types of attributes. The expression comprises various subexpressions, each subexpression based on a specific attribute.

The system performs the steps 515 and 520 for each subexpression. The system evaluates 515 the subexpression for each input video frame of the set. The system filters 520 the set of video frames to exclude video frames that do not satisfy the subexpression. Accordingly, the set of video frames may reduce in each iteration as video frames are filtered from the set. The evaluation of a subexpression may involve executing an ML model using the video frame to determine values of an attribute of the video frame. The system determines the value of the attribute and determines whether the value satisfies the subexpression. If the value satisfies the subexpression, the system keeps the video frame for further evaluation of subexpressions or else the system removes the video frame from the set for the next iteration.

The system uses 525 the filtered set of video frames for model training and validation. The use of different filtered sets corresponding to different traffic scenarios for model training ensures that the model is properly trained using training dataset representing a variety of traffic scenarios. The use of different filtered sets corresponding to different traffic scenarios for model validation ensures that the model is properly validated across a variety of traffic scenarios.

In some embodiments, if there are traffic scenarios in which the outputs of the ML model causes unnatural movements of the autonomous vehicle, the filtering criteria can be used to identify additional video frames corresponding to these traffic scenarios to be used for further training. In some embodiments, these traffic scenarios may be identified by users of the vehicles 102 and provided to the model training system 112. Responsive to receiving the identities of the traffic scenarios, the model training system 112 may modify the training dataset to include additional video frames for the traffic scenarios to improve the ML model accuracy in these traffic scenarios and movements of the autonomous vehicle.

Process of Generating Navigation Action Table Based on Ground Truth

Figure 6A:
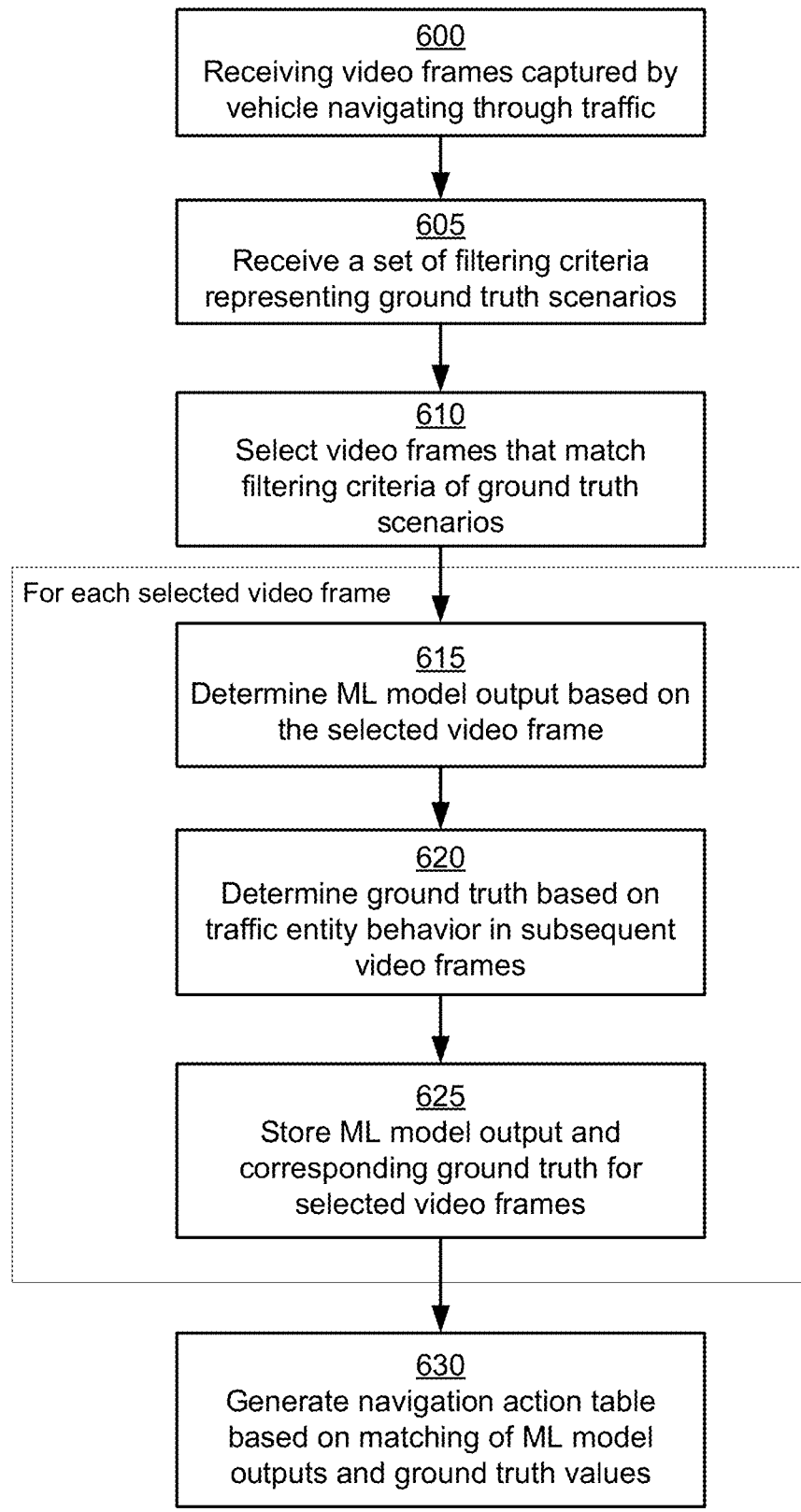
FIG. 6A represents a flowchart illustrating the process of generating the navigation action table using ground truth analysis of various traffic scenarios, according to some embodiments.

FIG. 6A represents a flowchart illustrating the process of generating the navigation action table using ground truth analysis of various traffic scenarios, according to an embodiment.

The ground truth module 250 receives 600 video frames captured by vehicles navigating through traffic, for example, autonomous vehicles. The ground truth module 250 also receives 605 filtering criteria representing ground truth scenarios. The filtering criteria may be provided by an expert. The ground truth module 250 selects 610 video frames that match the filtering criteria representing ground truth scenarios. The ground truth module 250 processes the ground truth video frames for determining ground truth values to be used for validating ML models. The ground truth values represents actual outcomes that can be compared to the predictions by the ML models. For example, ground truth values may indicate whether a pedestrian in the video frame crossed the street or stayed on the sidewalk based on subsequent video frames. In an embodiment, the ground truth module 250 performs offline processing of logs generated by autonomous vehicles as a result of driving through traffic. The logs store the outputs generated by the ML models based on input video frames continuously captured while the autonomous vehicle was driving.

The ground truth module 250 provides the video frames determined to be associated with ground truth scenarios as input to the ML models. The ground truth module 250 determines 615 the ML model output given the video frame as input. The ground truth module 250 may provide the ground truth video frame to the ML model and execute the ML model to determine the value predicted by the ML model. Alternatively, the ground truth module 250 may obtain the result of the ML model from the logs of the autonomous vehicle if the autonomous vehicle logs values computed by the ML model for various video frames as the autonomous vehicle navigates through traffic.

In some embodiments, for each input video frame, the ML model is configured to determine a probability distribution for the intention and a probability distribution for the awareness that capture the expected distributional characteristics of user responses describing these hidden context attributes responsive to annotators being presented with traffic situations. The output of the ML model for a video frame may include summary statistics associated with a traffic entity's intention to cross the road and a traffic entity's awareness of the vehicle. The summary statistics may include a mean and a standard deviation associated with each of the intention and the awareness. Based on the output of the ML model, the traffic scenario system predicts the behavior of the traffic entity.

The ground truth module 250 determines 620 the ground truth based on the behavior of the traffic entity as captured in video frames subsequent the selected video frame. Assume that V1 is the selected video frame processed by the ML model to generate an output result R1. In an embodiment, the ground truth module 250 analyzes the video frames that were captured after the selected video frame V1 but within a threshold time, for example, within the next 5-10 seconds. The ground truth module 250 determines whether the traffic entity took certain expected action. For example, the ground truth module 250 analyzes the video frames to determine whether a pedestrian crossed the street or stayed on the sidewalk. In an embodiment, the ground truth module 250 uses neural networks to identify the boundaries of the road and also a bounding box around the pedestrian. The ground truth module 250 determines whether the position of the bounding box around the pedestrian is within the boundaries of the road or outside the boundaries of the road to determine whether the pedestrian crossed the road or stayed on the sidewalk. The ground truth module 250 stores the result of the pedestrian action in a ground truth store. Accordingly, the traffic scenario system 116 is able to determine both the result of prediction of the ML model for a video frame and the ground truth representing the actual action that the pedestrian took and compare them to see whether the prediction of the ML model was accurate.

In some embodiments, the traffic scenario system 116 may identify video frames of ground truth scenarios that did not match the ground truth value. The traffic scenario system 116 may analyze the identified video frames to identify attributes shared among the video frames. The identified attributes may be provided to the model training system 112 to be used for selecting video frames to be used for generating stimuli to be presented to annotators and used for training the ML model.

The navigation action table module 260 generates 630 the navigation action table based on the stored data comprising the selected video frames, the corresponding ML model outputs, and the ground truth values. The navigation action table module 260 is generated based on a comparison of the outputs of the ML model for the various ground truth scenarios with the ground truth values. The vehicle computing system 120 determines actions that an autonomous vehicle should take in response to ML model outputs indicating certain behavior of a traffic entity in an input video frame. For example, if the ML model output indicates a high likelihood of a pedestrian crossing the street in front of the AV, the vehicle computing system determines the navigation action to stop. Similarly, if the ML model output indicates a high likelihood of a pedestrian staying on the sidewalk, the vehicle computing system determines the navigation action to continue driving. The example navigation action table module 260 determines the actions that the vehicle should take for a given range of values of the ML model output. For example, the navigation action table module 260 may determine that for the range of values v1 . . . v2, the autonomous vehicle navigation action is stop, for range of values v2 . . . v3, the autonomous vehicle navigation action is slow down, and for range of values v3 . . . v4, the autonomous vehicle navigation action is continue driving. The navigation action table module 260 adjust these ranges based on the comparison of the ground truth values to the ML model outputs.

Figure 6B:
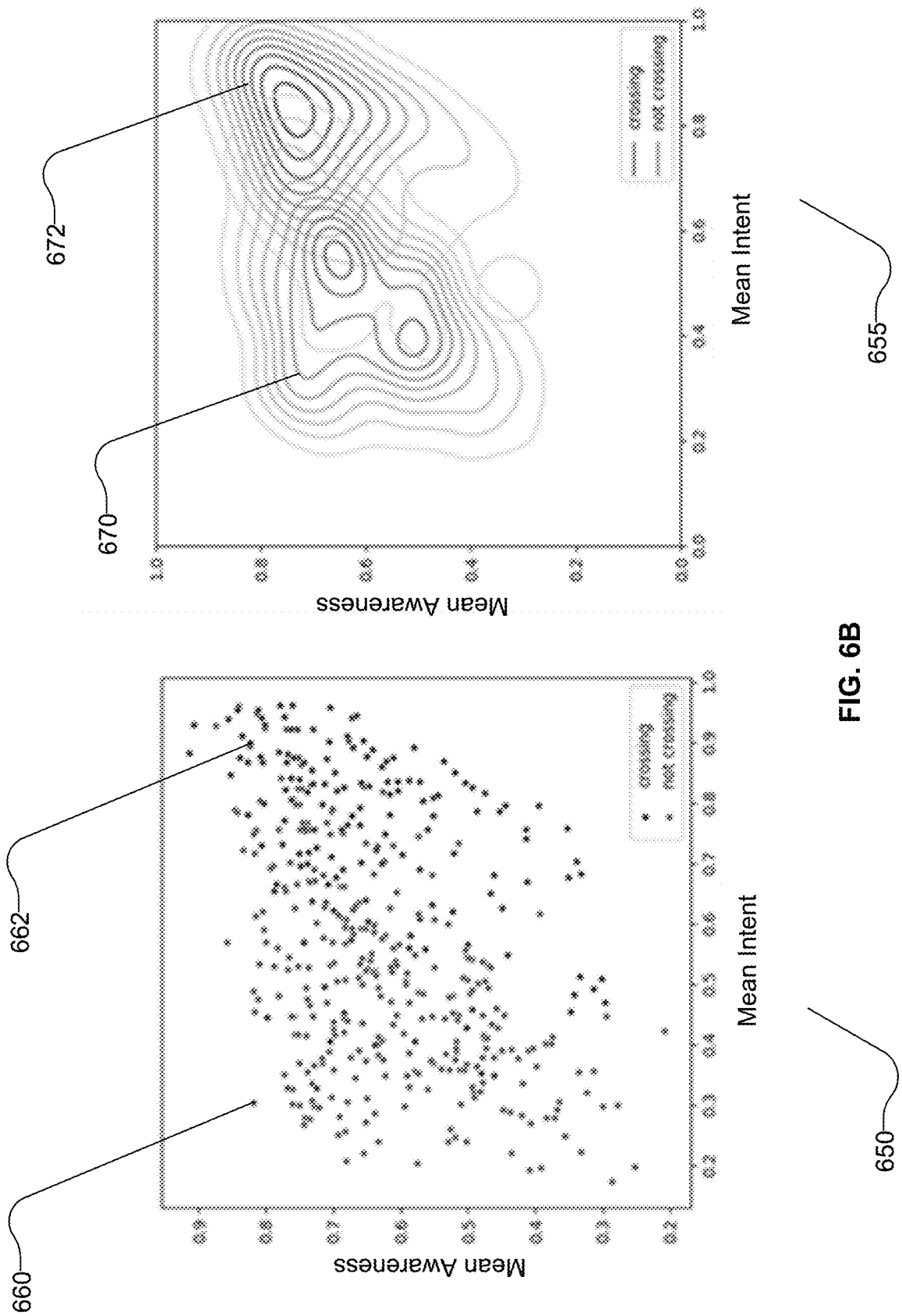
FIG. 6B illustrates ground truth analysis of various example traffic scenarios that are processed by the traffic scenario system, according to some embodiments.

FIG. 6B illustrates result ground truth analysis of various example traffic scenarios that are processed by the traffic scenario system 116 according to some embodiments. The X and Y axes in a scatterplot 650 and a contour plot 655 represent ML model outputs. In the scatterplot 650, each point is associated with a ground truth scenario, where the X axis is the mean awareness and the Y axis is the mean intent. In some embodiments, each point is associated with a sequence of video frames representing a ground truth scenario, where each video frame is associated with a mean awareness value and a mean intention value output from the ML model. The minimum mean awareness value in the sequence and the maximum mean intention may be used to plot the point. The color of the points in the scatterplot 650 represent the ground truth output, and the position of the points represent the ML model outputs. If the traffic entity behavior can be represented as one of two possible actions A1 and A2, some points 660 represent that the traffic entity performed A1 and some points 662 represent that the traffic entity performed action A2. For example, A1 may represent the action of a pedestrian crossing the street and A2 may represent the action of the pedestrian staying on the sidewalk and not crossing the street.

The navigation action table module 260 identifies ranges of ML model outputs and corresponding ground truth values. The navigation action table module 260 generates the navigation action table based on the likelihood of ML model accurately predicting the behavior of the traffic entity. If the navigation action table module 260 determines that the ML model accurately predicts the action that the traffic entity is likely to perform for a particular range of ML output values, the navigation action table module 260 determines the navigation action based on the prediction. For example, if the navigation action table module 260 determines that the ML model accurately predicts that a pedestrian is going to cross the street for a particular range of ML output values, the navigation action table module 260 determines the navigation action to be stop for that range of ML model outputs. If the navigation action table module 260 determines that the ML model accurately predicts that a pedestrian is not going to cross the street for a particular range of ML output values, the navigation action table module 260 determines the navigation action to be to continue to drive for that range of ML model outputs. If the navigation action table module 260 determines that the ML model fails to accurately predict the action that the traffic entity is likely to perform for a particular range of ML output values, the navigation action table module 260 determines the navigation action to be a safe action that would avoid collision with the traffic entity. For example, if the ground truth is different from the ML model prediction for a range of ML output values for possibly more than a threshold percentage of data points, the navigation action table module 260 may determine the navigation action to be slow down or stop rather than continue driving, even if the ML model predicts that the pedestrian is unlikely to cross the street.

In the contour plot 655, each contour line represents connects points that have the same ground truth values. Each of the first contour lines 670 connects points associated with action A1 with the same ground truth value, while each of the second contour lines 672 connects points associated with action A2 with the same ground truth value. Based on the contour plot 655, the navigation action table module 260 may determine the accuracy of the ML model in various regions of the ML output values to determine the navigation actions for different ranges of ML model output values.

In the example illustrated in FIG. 6B, the X and Y axes are mean awareness and mean intent. However, the navigation action table model 260 may determine the relationship between different pairs of output values of the ML model. For example, the navigation action table model 260 may plot the mean intention and the standard deviation of intention or the mean and the standard deviation associated with awareness.

Figure 6C:
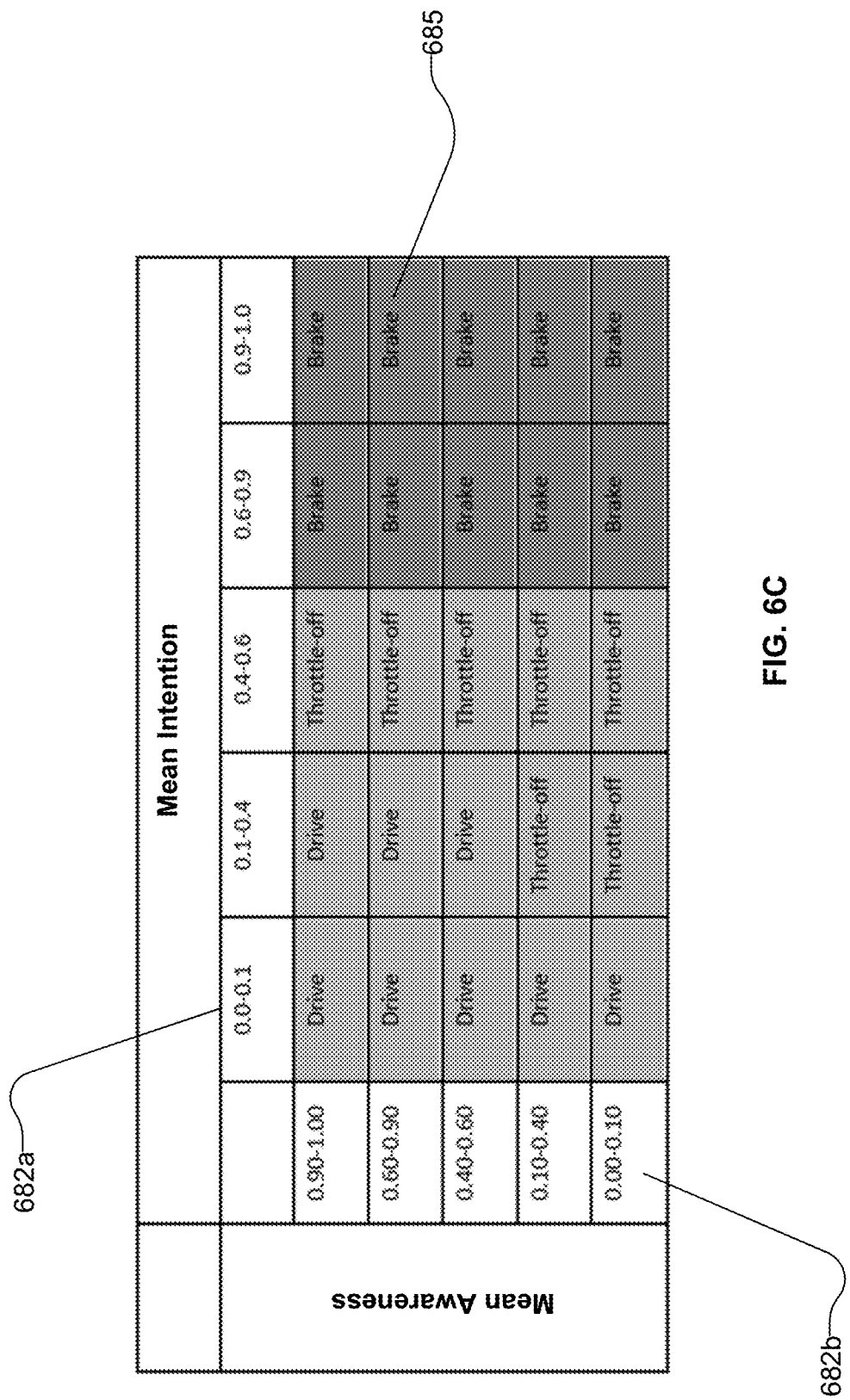
FIG. 6C illustrates an example navigation action table generated based on the ground truth analysis, according to some embodiments.

FIG. 6C illustrates an example navigation action table generated based on the ground truth analysis according to some embodiments. As shown in FIG. 6C, the navigation action table maps ranges 682 of model output values to navigation actions 685 that an autonomous vehicle should take for those ranges of ML output values, for example, drive, brake, or throttle-off. FIG. 6C corresponds to the ground truth analysis of FIG. 6B, and a first axis of the navigation action table corresponds to a range 682*a* for mean intention, and a second axis of the navigation action table corresponds to a range 682*b* for mean awareness.

In some embodiments, the system generates multiple navigation action tables. Each navigation table may be for a different context. For example, the system may generate different navigation action table for different types of traffic entities. The system may generate different navigation action table for different traffic conditions, for example, different types of cities (based on how busy the traffic is in each city), different weather conditions, different types of roads (highways vs. small streets etc.), and so on. The vehicle selects the appropriate navigation table at execution time by determining the context. For example, the type of city may be determined by determining the vehicle location based on GPS data and checking a lookup table that maps locations to city types. The vehicle may determine the road type based on vehicle location determined based on GPS data and a geographical map. The vehicle may determine weather conditions based on a server of web service that provides weather for specific locations. The vehicle may determine the type of traffic entity based on a machine learning model that processes an image of the traffic entity captured by cameras of the vehicle. The vehicle determines the context and selects the appropriate navigation action table for use during navigation. In some embodiments, multiple navigation action tables may be used to determine the action. Based on the output of the ML model, the vehicle may determine corresponding action for each navigation action table and select the most conservative action. For example, if a first navigation action table indicates that the vehicle should drive while a second navigation action table indicates that the vehicle should throttle-off, the vehicle may choose to "throttle off."

In some embodiments, the system determines different navigation action tables for different types of hidden context attributes. For example, the system may generate one navigation table for intention predictions of pedestrians and another navigation table for awareness of autonomous vehicle. The autonomous vehicle uses the appropriate navigation table based on the use case (which hidden context attribute needs to be used).

Process of Navigating an Autonomous Vehicle Through Traffic

Figure 7:
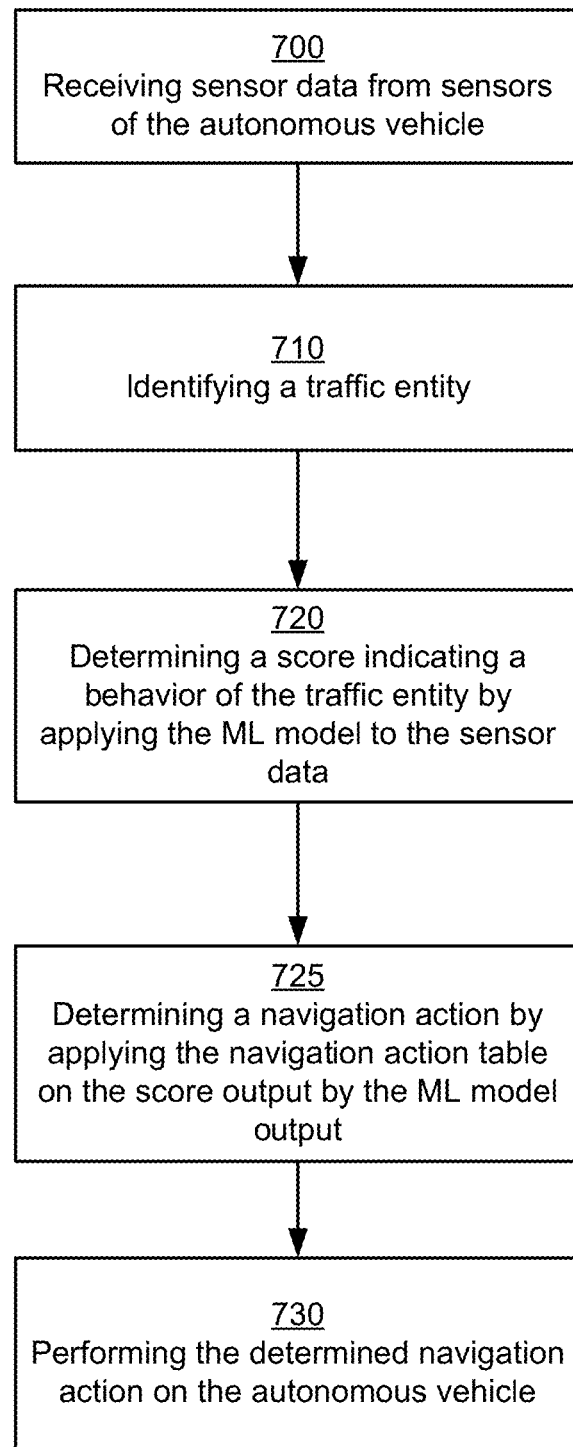
FIG. 7 represents a flowchart illustrating the process of navigating the autonomous vehicle using the navigation action table, according to some embodiments.

FIG. 7 represents a flowchart illustrating the process of navigating the autonomous vehicle using the navigation action table, according to an embodiment. The steps illustrated in the flowchart may be performed in an order different from that illustrated in FIG. 7. For example, certain steps may be performed in parallel. The steps may be performed by modules other than those indicated herein.

The vehicle computing system 120 receives 700 sensor data from sensors of the autonomous vehicle. For example, the vehicle computing system 120 may receive lidar scans from lidars and camera images from cameras mounted on the autonomous vehicle. If there are multiple cameras mounted on the vehicle, the vehicle computing system 120 receives videos or images captured by each of the cameras. In an embodiment, the vehicle computing system 120 builds a point cloud representation of the surroundings of the autonomous vehicle based on the sensor data. The point cloud representation includes coordinates of points surrounding the vehicle, for example, three dimensional points and parameters describing each point, for example, the color, intensity, and so on.

The vehicle computing system 120 identifies 710 a traffic entity based on the sensor data, for example, a pedestrian, bicyclist, or another traffic entity in the traffic. The vehicle computing system 120 determines 720 a score indicating a behavior of the traffic entity by applying the ML model to the sensor data. The vehicle computing system 120 uses the navigation action table to determine 725 the navigation action corresponding to the score determined by the ML model. The navigation action could be to stop, continue driving, or slow down. The vehicle computing system sends signals to the controls of the autonomous vehicle to perform 730 the determined navigation action.

Computing Machine Architecture

Figure 8:
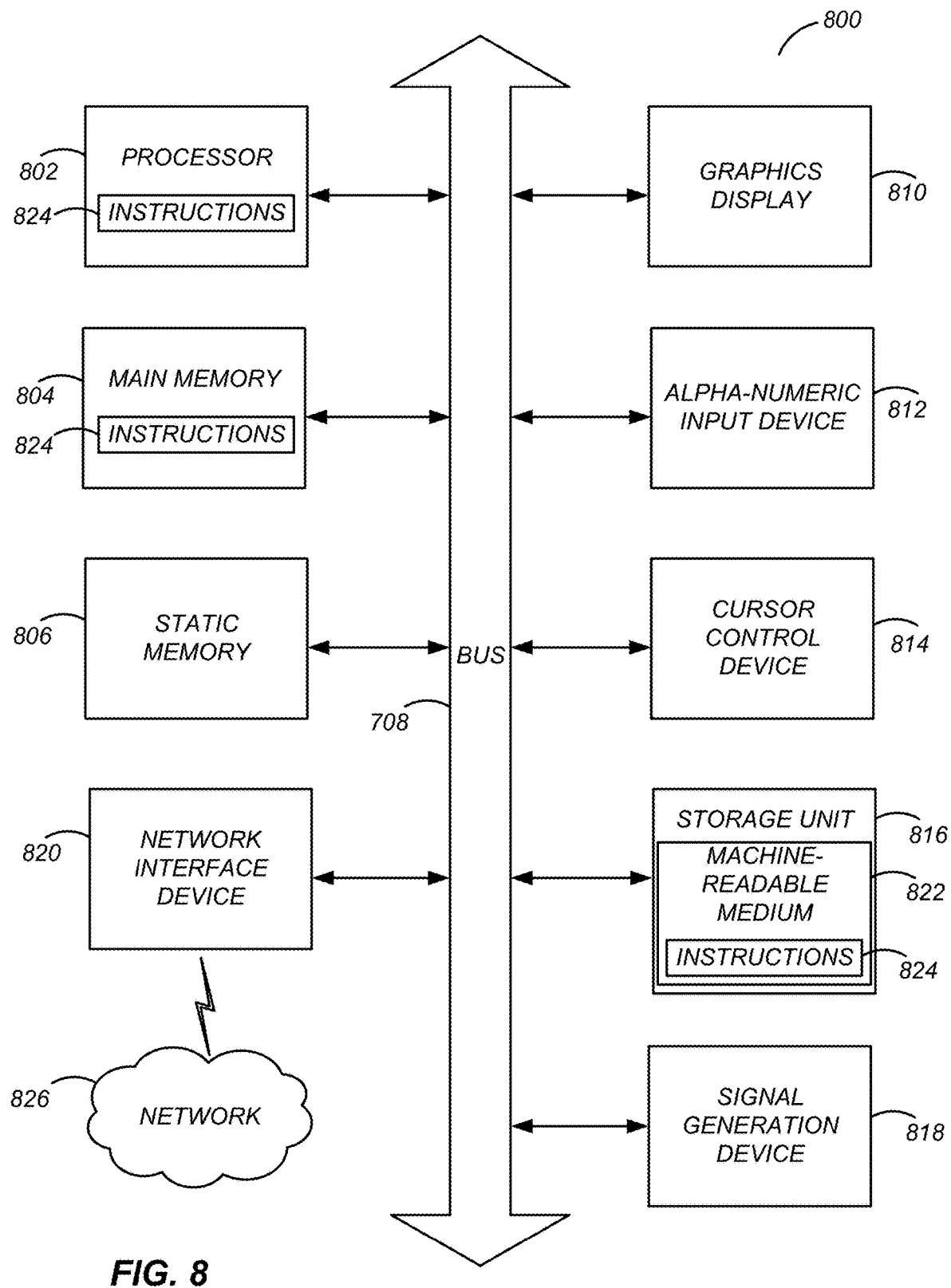
FIG. 8 is a block diagram illustrating components of an example machine able to read instructions from a machine-readable medium and execute them in a processor (or controller), according to some embodiments.

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Although embodiments disclosed describe techniques for navigating autonomous vehicles, the techniques disclosed are applicable to any mobile apparatus, for example, a robot, a delivery vehicle, a drone, and so on.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method comprising:
    identifying sets of video frames associated with ground truth scenarios, each set of video frames associated with an additional set of video frames captured within a threshold time interval of the set of video frames;
    for each set of video frames associated with a ground truth scenario:
        providing the set of video frames as input to a machine learning based model that outputs one or more values associated with attributes describing a state of mind of a traffic entity in the set of video frames;
        determining a predicted behavior of the traffic entity based on the one or more values;
        determining an actual behavior of the traffic entity based on a corresponding additional set of video frames; and
        comparing the predicted behavior and the actual behavior;
    generating a navigation action table mapping output values of the machine learning based model to navigation actions to be performed by an autonomous vehicle based on comparisons of the predicted behavior and the actual behavior of the sets of video frames associated with the ground truth scenarios; and
    causing an autonomous vehicle to perform a navigation action using the navigation action table.

2. The method of claim 1, wherein identifying one or more sets of video frames associated with a ground truth scenario comprises:
    receiving a plurality of video frames captured by cameras mounted on one or more vehicles, each video frame associated with vehicle attributes of the vehicle that captured the video frame;
    receiving a set of filtering criteria associated with the ground truth scenario and comprising an expression specifying values of one or more attributes of the vehicle attributes, traffic attributes, and road attributes; and filtering the plurality of video frames according to the set of filtering criteria to identify the set of video frames associated with ground truth scenarios.

3. The method of claim 2, wherein the vehicle attributes comprise one or more of: a speed, a turn direction, and a location of the vehicle.

4. The method of claim 2, wherein traffic attributes indicate one or more of: whether traffic includes a pedestrian likely to cross street, whether traffic includes a pedestrian aware of the vehicle, a distance from a traffic entity from the vehicle, whether a pedestrian is on a sidewalk, whether a pedestrian on road, and a direction a traffic entity is moving.

5. The method of claim 2, wherein road attributes indicate one or more of: whether there is a crosswalk coming up within a threshold distance in a direction in which the vehicle is moving and whether there is an intersection within threshold distance in the direction in which the vehicle is moving.

6. The method of claim 2, wherein the filtering criteria corresponding to a ground truth scenario is configured to identify video frames that show a pedestrian within a threshold distance of the vehicle that captured the video frames.

7. The method of claim 1, wherein causing the autonomous vehicle to perform the navigation action using the navigation action table comprises:
receiving sensor data captured by sensors of the autonomous vehicle;
providing the sensor data as input to the machine learning based model that outputs one or more values associated with attributes of a traffic entity represented in the sensor data;
determining the navigation action corresponding to the one or more values associated with attributes in the navigation action table; and
providing signals to controls of the autonomous vehicle to perform the determined navigation action.

8. The method of claim 7, wherein the sensor data represents one or more images captured by a camera mounted on the autonomous vehicle.

9. The method of claim 7, wherein the sensor data represents a lidar scan captured by a lidar mounted on the autonomous vehicle.

10. The method of claim 1, wherein the machine learning based model is a convolutional neural network.

11. The method of claim 1, further comprising, training the machine learning based model, the training comprising:
presenting a training set of video frames captured by one or more vehicles to a plurality of users, each video frame annotated with an indication of a turn direction of the corresponding vehicle;
receiving responses of users;
generating statistical information describing the responses; and
providing the statistical information describing the responses as training data to the machine learning based model.

12. The method of claim 1, wherein determining the actual behavior of the traffic entity further comprises:
determining whether a position of a bounding box around the traffic entity in the set of video frames is within boundaries of a road or outside boundaries of the road;
responsive to determining that the position of the bounding box is within the boundaries of the road, determining that the traffic entity is crossing the road; and
responsive to determining that the position of the bounding box is outside the boundaries of the road, determining that the traffic entity is not crossing the road.

13. A non-transitory computer readable storage medium storing instructions that when executed by a computer processor, cause the computer processor to perform steps of:
identifying sets of video frames associated with ground truth scenarios, each set of video frames associated with an additional set of video frames captured within a threshold time interval of the set of video frames;
for each set of video frames associated with a ground truth scenario:
providing the set of video frames as input to a machine learning based model that outputs one or more values associated with attributes describing a state of mind of a traffic entity in the set of video frames;
determining a predicted behavior of the traffic entity based on the one or more values;
determining an actual behavior of the traffic entity based on a corresponding additional set of video frames; and
comparing the predicted behavior and the actual behavior;
generating a navigation action table mapping output values of the machine learning based model to navigation actions to be performed by an autonomous vehicle based on comparisons of the predicted behavior and the actual behavior of the sets of video frames associated with the ground truth scenarios; and
causing an autonomous vehicle to perform a navigation action using the navigation action table.

14. The non-transitory computer readable storage medium of claim 13, wherein identifying one or more sets of video frames associated with a ground truth scenario comprises:
receiving a plurality of video frames captured by cameras mounted on one or more vehicles, each video frame associated with vehicle attributes of the vehicle that captured the video frame;
receiving a set of filtering criteria associated with the ground truth scenario and comprising an expression specifying values of one or more attributes of the vehicle attributes, traffic attributes, and road attributes; and
filtering the plurality of video frames according to the set of filtering criteria to identify the set of video frames associated with ground truth scenarios.

15. The non-transitory computer readable storage medium of claim 14, wherein causing the autonomous vehicle to perform the navigation action using the navigation action table comprises:
receiving sensor data captured by sensors of the autonomous vehicle;
providing the sensor data as input to the machine learning based model that outputs one or more values associated with attributes of a traffic entity represented in the sensor data;
determining the navigation action corresponding to the one or more values associated with attributes in the navigation action table; and
providing signals to controls of the autonomous vehicle to perform the determined navigation action.

16. The non-transitory computer readable storage medium of claim 13, further storing instructions that when executed by a computer processor, cause the computer processor to perform steps for training the machine learning based model, the steps comprising:

presenting a training set of video frames captured by one or more vehicles to a plurality of users, each video frame annotated with an indication of a turn direction of the corresponding vehicle;

receiving responses of users;

generating statistical information describing the responses; and providing the statistical information describing the responses as training data to the machine learning based model.

17. A computer system comprising:

a computer processor; and a non-transitory computer readable storage medium storing instructions that when executed by the computer processor, cause the computer processor to perform steps of:

identifying sets of video frames associated with ground truth scenarios, each set of video frames associated with an additional set of video frames captured within a threshold time interval of the set of video frames;

for each set of video frames associated with a ground truth scenario:

providing the set of video frames as input to a machine learning based model that outputs one or more values associated with attributes describing a state of mind of a traffic entity in the set of video frames;

determining a predicted behavior of the traffic entity based on the one or more values;

determining an actual behavior of the traffic entity based on a corresponding additional set of video frames; and comparing the predicted behavior and the actual behavior;

generating a navigation action table mapping output values of the machine learning based model to navigation actions to be performed by an autonomous vehicle based on comparisons of the predicted behavior and the actual behavior of the sets of video frames associated with the ground truth scenarios; and causing an autonomous vehicle to perform a navigation action using the navigation action table.

18. The computer system of claim 17, wherein identifying one or more sets of video frames associated with a ground truth scenario comprises:

receiving a plurality of video frames captured by cameras mounted on one or more vehicles, each video frame associated with vehicle attributes of the vehicle that captured the video frame;

receiving a set of filtering criteria associated with the ground truth scenario and comprising an expression specifying values of one or more attributes of the vehicle attributes, traffic attributes, and road attributes; and filtering the plurality of video frames according to the set of filtering criteria to identify the set of video frames associated with ground truth scenarios.

19. The computer system of claim 17, wherein causing the autonomous vehicle to perform the navigation action using the navigation action table comprises:

receiving sensor data captured by sensors of the autonomous vehicle;

providing the sensor data as input to the machine learning based model that outputs one or more values associated with attributes of a traffic entity represented in the sensor data;

determining the navigation action corresponding to the one or more values associated with attributes in the navigation action table; and providing signals to controls of the autonomous vehicle to perform the determined navigation action.

20. The computer system of claim 17, further storing instructions that when executed by a computer processor, cause the computer processor to perform steps for training the machine learning based model, the steps comprising:

presenting a training set of video frames captured by one or more vehicles to a plurality of users, each video frame annotated with an indication of a turn direction of the corresponding vehicle;

receiving responses of users;

generating statistical information describing the responses; and providing the statistical information describing the responses as training data to the machine learning based model.

* * * * *